(12) United States Patent
Mestha et al.

(10) Patent No.: US 8,451,495 B2
(45) Date of Patent: May 28, 2013

(54) COLOR INCONSTANCY GUIDE FOR SPOT COLOR PRINT APPLICATIONS

(75) Inventors: Lalit Keshav Mestha, Fairport, NY (US); Yonghui Zhao, Penfield, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 785 days.

(21) Appl. No.: 12/645,832

(22) Filed: Dec. 23, 2009

(65) Prior Publication Data

US 2011/0149311 A1 Jun. 23, 2011

(51) Int. Cl.
*G06F 15/00* (2006.01)
*H04N 1/40* (2006.01)
*G06K 9/00* (2006.01)

(52) U.S. Cl. .................. 358/1.9; 358/2.1; 382/167

(58) Field of Classification Search ................ None
See application file for complete search history.

(56) References Cited

U.S. PATENT DOCUMENTS

| | | | |
|---|---|---|---|
| 6,698,860 B2 | 3/2004 | Berns et al. | |
| 7,397,581 B2 | 7/2008 | Mestha et al. | |
| 8,031,938 B2 * | 10/2011 | Edge | 382/167 |
| 2005/0094169 A1 | 5/2005 | Berns et al. | |
| 2008/0043263 A1 | 2/2008 | Hancock et al. | |
| 2009/0257648 A1 * | 10/2009 | Edge | 382/162 |

OTHER PUBLICATIONS

U.S. Appl. No. 12/645,859, filed Dec. 23, 2009, Mestha et al.
U.S. Appl. No. 12/645,875, filed Dec. 23, 2009, Mestha et al.
U.S. Appl. No. 12/504,332, filed Jul. 16, 2009, Mestha et al.
U.S. Appl. No. 12/533,542, filed Jul. 31, 2009, Gil et al.
Wyble, David R. and Berns, Roy S., A Critical Review of Spectral Models Applied to Binary Color Printing, May 1, 1999, John Wiley & Sons, Inc., Rochester, NY. USA.
Ohno, Yoshi, CIE Fundamentals for Color Measurements, IS&T NIP16 Conference, Oct. 16, 2000, National Institute of Standards and Technology, Gaithersburg, MD, USA.
Susstrunk, Sabine and Holm, Jack and Finlayson, Graham D., Chromatic Adaptation Performance of Different RGB Sensors, IS&T/SPIE Electronic Imaging, SPIE vol. 4300, Jan. 2001, Swiss Federal Institute of Technology(EPFL), Lausanne, Switzerland.
Kheng, Leow Wee, Color Spaces and Color-Difference Equations, Feb. 19, 2002, Department of Computer Science, National University of Singapore, Singapore.
Sharma, Gaurav and Wu, Wencheng and Dalal, Edul N., The CIEDE2000 Color-Difference Formula: Implementation Notes, Supplementary Test Data, and Mathematical Observations, Feb. 9, 2004, ECE Department University of Rochester, Rochester, NY, USA.

(Continued)

*Primary Examiner* — Barbara Reinier
(74) *Attorney, Agent, or Firm* — Philip E. Blair; Fleit Gibbons Gutman Bongini & Bianco P.L.

(57) ABSTRACT

What is disclosed is a novel system and method for generating a color inconstancy guide for use in spot color print applications. In a manner more fully disclosed herein, color inconstancy values are calculated for selected spot colors of interest using a color inconstancy metric. A color inconstancy guide is generated from the calculated color inconstancy values and their respective spot colors. Thereafter, when a user desires to render a job in a particular spot color, the associated color inconstancy value for that color can be obtained from the guide. In various embodiments, recommendations in the form of a suggested printer to use, a media type, a halftone screen, and other meaningful assistance can be provided for spot color selection that are less sensitive to varying illuminations for a given print/copy job. The present color inconstancy guide provides meaningful extensions in color quality and color reproduction in print/copy job environments.

25 Claims, 16 Drawing Sheets

OTHER PUBLICATIONS

Fairchild, Mark D., Color Appearance Models: CIECAM02 and Beyond, IS&T/SID 12$^{th}$ Color Imaging Cpnference Tutorial T1A, Nov. 9, 2004, RIT Munsell Color Science Laboratory, Rochester, NY, USA.

International Color Consortium, ICC Recommendations for Color Measurement White Paper No. 3 Level. Introductory, International Color Consortium, Dec. 2001, USA.

Susstrunk, Sabine and Finlayson. Graham D., Evaluating Chromatic Adaptation Transform Performance, Proc. IS&T/SID 13$^{th}$ Color Imaging Conference, Ecole Polytechnique Federale de Lausanne (EPFL), 2005, Lausanne, Switzerland.

Chen, Y. and Berns, R. S. and Taplin, L. A., Exploring the Color Inconstancy of Prints, AIC Colour 05-10$^{th}$ Congress of the International Colour Association, Munsell Color Science Laboratory, May 13, 2005, Rochester, NY, USA.

Finlayson, Graham D. and Susstrunk, Sabine, Performance of a Chromatic Adaptation Transform based on Spectral Sharpening, School of Information Systems, The University of East Anglia, Oct. 16, 2007, Norwich, UK.

Hunterlab, Color Inconstancy, vol. 12. No. 11, 2008, USA.

* cited by examiner

| Avg CII < 1 for Offset Printer | |
|---|---|
| Color Name | Avg CII |
| PANTONE 433 U | 0.37 |
| PANTONE 7540 U | 0.38 |
| PANTONE 425 U | 0.39 |
| PANTONE 426 U | 0.39 |
| PANTONE Cool Gray 11 U | 0.40 |
| PANTONE 424 U | 0.40 |
| PANTONE Cool Gray 10 U | 0.42 |
| PANTONE 877 U | 0.42 |
| PANTONE Cool Gray 9 U | 0.43 |
| PANTONE 7539 U | 0.44 |
| PANTONE 423 U | 0.44 |
| PANTONE Cool Gray 8 U | 0.46 |
| PANTONE Cool Gray 7 U | 0.46 |
| PANTONE 422 U | 0.49 |
| PANTONE Cool Gray 6 U | 0.49 |
| PANTONE 432 U | 0.51 |
| PANTONE 5315 U | 0.52 |
| PANTONE Cool Gray 5 U | 0.54 |
| PANTONE 427 U | 0.56 |
| PANTONE 7443 U | 0.56 |
| PANTONE 419 U | 0.57 |
| PANTONE Black 3 U | 0.57 |
| PANTONE 7541 U | 0.57 |
| PANTONE Cool Gray 4 U | 0.58 |
| PANTONE Black 6 U | 0.59 |
| PANTONE 428 U | 0.60 |
| PANTONE 429 U | 0.60 |
| PANTONE 421 U | 0.61 |
| PANTONE 418 U | 0.61 |
| PANTONE Cool Gray 1 U | 0.62 |
| PANTONE Cool Gray 3 U | 0.63 |
| PANTONE 417 U | 0.63 |
| PANTONE 663 U | 0.64 |
| PANTONE 431 U | 0.65 |
| PANTONE 532 U | 0.65 |
| PANTONE Cool Gray 2 U | 0.65 |
| PANTONE Hexachrome Black U | 0.66 |
| PANTONE 7538 U | 0.66 |

FROM FIG. 10A-1

| | |
|---|---|
| PANTONE 416 U | 0.66 |
| PANTONE Black 7 U | 0.67 |
| PANTONE Process Black U | 0.67 |
| PANTONE 430 U | 0.67 |
| PANTONE 7537 U | 0.69 |
| PANTONE 420 U | 0.70 |
| PANTONE 7547 U | 0.70 |
| PANTONE 7543 U | 0.73 |
| PANTONE Warm Gray 1 U | 0.74 |
| PANTONE 415 U | 0.76 |
| PANTONE 8100 U | 0.80 |
| PANTONE 7544 U | 0.81 |
| PANTONE 405 U | 0.86 |
| PANTONE 7546 U | 0.86 |
| PANTONE 402 U | 0.86 |
| PANTONE 414 U | 0.88 |
| PANTONE 404 U | 0.88 |
| PANTONE 403 U | 0.88 |
| PANTONE Warm Gray 11 U | 0.88 |
| PANTONE Warm Gray 10 U | 0.90 |
| PANTONE Warm Gray 2 U | 0.91 |
| PANTONE 5175 U | 0.91 |
| PANTONE 411 U | 0.91 |
| PANTONE Warm Gray 8 U | 0.91 |
| PANTONE Warm Gray 9 U | 0.91 |
| PANTONE 401 U | 0.91 |
| PANTONE 7545 U | 0.92 |
| PANTONE Black U | 0.92 |
| PANTONE 413 U | 0.93 |
| PANTONE Warm Gray 7 U | 0.93 |
| PANTONE Warm Gray 6 U | 0.94 |
| PANTONE 524 U | 0.95 |
| PANTONE 400 U | 0.97 |
| PANTONE 447 U | 0.98 |
| PANTONE 410 U | 0.98 |
| PANTONE 649 U | 0.98 |
| PANTONE 518 U | 0.98 |
| PANTONE 664 U | 0.99 |
| PANTONE 412 U | 0.99 |

| Avg CII > 5 for Offset Printer | |
|---|---|
| Color Name | Avg CII |
| PANTONE Orange 021 U | 5.02 |
| PANTONE 812 U | 5.09 |
| PANTONE 805 U | 5.10 |
| PANTONE 7467 U | 5.14 |
| PANTONE 2735 U | 5.17 |
| PANTONE 2728 U | 5.19 |
| PANTONE 300 U | 5.20 |
| PANTONE 3272 U | 5.21 |
| PANTONE Hexachrome Cyan U | 5.23 |
| PANTONE 801 U | 5.26 |
| PANTONE 2736 U | 5.27 |
| PANTONE 3005 U | 5.36 |
| PANTONE 327 U | 5.41 |
| PANTONE 320 U | 5.41 |
| PANTONE 313 U | 5.42 |
| PANTONE 3135 U | 5.50 |
| PANTONE 7460 U | 5.51 |
| PANTONE Process Blue U | 5.77 |
| PANTONE Blue 072 U | 5.98 |

| Avg CII > 5 for iGen4 Spot Colors | |
|---|---|
| Color Name | Avg CII |
| PANTONE 2738 U | 5.02 |
| PANTONE Blue 072 U | 5.02 |
| PANTONE 2945 U | 5.03 |
| PANTONE 639 U | 5.03 |
| PANTONE 293 U | 5.04 |
| PANTONE 3288 U | 5.08 |
| PANTONE 7474 U | 5.12 |
| PANTONE 286 U | 5.13 |
| PANTONE 322 U | 5.19 |
| PANTONE 327 U | 5.22 |
| PANTONE 641 U | 5.25 |
| PANTONE 3015 U | 5.31 |
| PANTONE 3282 U | 5.32 |
| PANTONE 320 U | 5.34 |
| PANTONE 313 U | 5.43 |
| PANTONE 3135 U | 5.50 |
| PANTONE Hexachrome Cyan U | 5.51 |
| PANTONE 633 U | 5.61 |
| PANTONE Process Blue U | 5.67 |
| PANTONE 7460 U | 5.69 |
| PANTONE 2935 U | 5.70 |
| PANTONE 321 U | 5.73 |
| PANTONE 307 U | 5.80 |
| PANTONE 3145 U | 5.88 |
| PANTONE 640 U | 5.92 |
| PANTONE 314 U | 5.98 |
| PANTONE 300 U | 6.01 |
| PANTONE 3005 U | 6.07 |

COLOR INCONSTANCY GUIDE FOR SPOT COLOR PRINT APPLICATIONS

TECHNICAL FIELD

The present invention is directed to systems and methods for generating a color inconstancy guide based upon a color inconstancy metric calculated for a library of spot colors available on a digital front end (DFE) of a print device for use in spot color print applications in a print/copy job environment.

BACKGROUND

Color inconstancy is the undesirable change in color of an object caused by a change in illumination. Conversely, color constancy is the tendency of the color of an object to remain constant when the level and color of the illumination are changed. Color inconstancy is typically unavoidable, which means that colors tend to be perceived differently under different illuminants. Color inconstancy is a very important factor to evaluate for the image quality of prints since prints tend to be viewed under a wide variety of differing lighting sources and conditions. For example, color inconstancy occurs frequently when profiles are created for standardized daylight but are viewed under narrow-band fluorescent illumination. This can be an acute problem depending on the spectral properties of the inks used in the print process and the method of building the color look-up table (CLUT). FIG. 1 shows some printing samples with relatively large color inconstancy between standard daylight (D50) and fluorescent (F11) light sources. In FIG. 1, the tail of the illustrated arrows represents the tristimulus values of prints under fluorescent lighting (F11) and the head of the arrows represents the tristimulus values under standard daylight (D50).

For a specific print device, it's color inconstancy range is determined by its ink set and the substrate employed. In order to explore the color inconstancy property for a given print device, a virtual printer model needs to be developed which is based upon the spectral reflectances of the inks and substrates used by that printer. Though the virtual printer model cannot provide a highly accurate prediction for a specific spot color, it can be used to evaluate some basic properties of printers, such as color inconstancy. No common theory exists to explain the various mechanism of color constancy on the human visual system. It is important that color materials, especially those in color print, exhibit color constancy. A seasoned color expert (human) may be able to visually determine which spot colors are best to use on a given marking device from a color constancy perspective. However, the average user/customer of document reproduction devices is not likely to have the experience and visual acuity to select colors best viewed under different lighting sources. Having precise metrics, from a color constancy perspective, for a given spot color at the start of a print/copy job greatly benefits system operators in their print/copy job environments. Such metrics are further needed by designer of color documents, color brochures, logos, and the like, who need to have metrics useful for selecting colors which will likely look the same under various illuminants once rendered.

Accordingly, what is needed in this art are increasingly sophisticated systems and methods for generating a color inconstancy guide for use in spot color print applications in a print/copy job environment.

INCORPORATED REFERENCES

The following U.S. patents, U.S. patent applications, and Publications are incorporated herein in their entirety by reference.

"Production Of Color Conversion Profile For Printing", U.S. patent application Ser. No. 10/700,658, filed: Nov. 3, 2003.

"Adaptive Illumination Independent Matching of Spot Colors", U.S. patent application Ser. No. 12/504,332, filed: Jul. 16, 2009.

"Adaptive Illumination Independent Matching of Out-Of-Gamut Spot Colors Using Various Gamut Mapping Techniques", U.S. patent application Ser. No. 12/533,542, filed: Jul. 31, 2009.

"System And Method For Automated Spot Color Editor", U.S. patent application Ser. No. 11/507,405, filed: Feb. 21, 2008. Automated Spot Color Editing is a Xerox technology which uses an iterative process to find device-specific color recipes under a standardized daylight (D50 illuminant) using inline sensors in many Xerox devices such as, for instance, iGen3®, DC7002®, DC8000®, DC8002, and Digital Press.

"Billmeyer and Saltzman's Principles of Color Technology", Roy S. Berns, Wiley-Interscience, 3rd Ed. (March 2000), ISBN-10: 047119459X, ISBN-13: 978-0471194590.

"Principles of Color Reproduction", John Yule and Gary Field, Graphic Arts Technical Foundation Press, $2^{nd}$ Rev. Ed. (2001), ISBN-13: 978-0883622223.

"Color Constancy (The Wiley-IS&T Series in Imaging Science and Technology)", Marc Ebner (Author), Wiley; 1st Ed. (2007) ISBN-13: 978-0470058299.

"Introduction to Color Imaging Science", Hsein-Che Lee (Author), Cambridge University Press, $1^{st}$ Ed. Reissue (Mar. 19, 2009) ISBN-13: 978-0521103138.

"Colorimetry: Understanding the CIE System", Janos Schanda (Editor), Wiley-Interscience; Annotated Ed. (Aug. 10, 2007) ISBN-13: 978-0470049044.

"CIE Fundamentals for Color Measurements", Yoshi Ohno (Author), Proceedings IS&T NIP16 Intl. Conf. on Digital Printing Technologies, pp. 540-545 (October 2000).

"ISO/CIE10526:1999, CIE Standard Illuminants For Colorimetry", (Paperback), American National Standards Institute (ANSI), (Aug. 23, 2007) ASIN: B000XYT21Q.

"The CIEDE2000 Color-Difference Formula: Implementation Nodes, Supplementary Test Data, and Mathematical Observations", G. Sharma, W. Wu, E. N. Dalal, Color Research and Application, Vol. 30. No. 1, (February 2005).

"Computational Color Technology", Henry R. Kang (Author) SPIE Publications (May 17, 2006), ISBN-13: 978-0819461193.

"Measuring Colour", R. W. G. Hunt (Author), Fountain Press Ltd, 3rd Ed. (January 2001), ISBN-13: 978-0863433870.

"Chromatic Adaptation Performance of Different RGB Sensors", S. Süsstrunk, J. Holm and G. D. Finlayson, Proc. IS&T/SPIE Electronic Imaging 2001: Color Imaging, Vol. 4300, pp. 172-183, (2001).

"ICC Recommendations for Color Measurement", ICC White Paper #3, ICC Consortium (2004).

BRIEF SUMMARY

What is disclosed is a novel system and method for generating a color inconstancy guide for use in spot color print applications in print/copy job environments. In a manner more fully disclosed herein, color inconstancy values are calculated for selected spot colors of interest using a Color Inconstancy Metric, as defined herein. A color inconstancy guide is generated from the calculated color inconstancy values and their respective spot colors. Thereafter, when a user desires to render a job in a particular spot color, the associated color inconstancy value for that color can be obtained from the guide. In various embodiments, recommendations and other meaningful assistance are provided for spot color selection for use in print/copy jobs which are less sensitive to varying illuminations. The generated color inconstancy guide provides meaningful extensions in color quality and color reproduction in diverse print/copy job environments.

In one example embodiment, the present method for generating a color inconstancy guide involves the following. First, spot colors of interest are selected from a library of spot colors available on a digital front end (DFE) of a reference color marking device. The spot color library may include non-standard spot colors, i.e., user-defined spot colors, or standard spot colors from a known source such as color defined by a Pantone® standard (i.e., PMS or GOE). A color value is obtained for each of the selected spot colors of interest. At least one color value is obtained for each of the selected spot colors of interest. In various embodiments hereof, the color value is obtained from spectral data defined by a standard, a spectral printer model of the reference color marking device, or from spectral reflectance values obtained from measurements using a spectrophotometer. In other embodiments, the color value for the selected spot colors of interest is obtained by printing at least one test patch of each respective spot color of interest using the reference color marking device, and measuring the color value from the printed test patch using, for example, a spectrophotometer, a colorimeter, or a scanning device. Using a Color Inconstancy Metric, a color inconstancy value is calculated for each spot color of interest based upon the obtained color values. Various embodiments for Color Inconstancy Metrics are provided. The determined color inconstancy values are then sorted to produce a sorted list of color inconstancy values and respective spot colors. The sorted list is divided into a first section and a second section. Spot colors of the first section are determined to have substantially similar respective colors when viewed under different illuminants when rendered on different image output devices. Spot colors of the second section are determined to have an increased likelihood of color inconstancy. Thereafter, the color inconstancy guide is generated from color inconstancy values of at least the first section of the sorted list for use in spot color print applications. Various embodiments hereof have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 10A is an example color inconstancy guide generated for an Offset Printer with the sorted list having been divided into a first section of spot colors having an average CII value of less than 1.0;

FIG. 10B shows a sorted list of spot colors having an average CII value of greater than 5.0 generated for an Offset Printer, for explanatory and comparison purposes;

DETAILED DESCRIPTION

What is provided are a system and method for generating a color inconstancy guide for spot color printing applications. Color inconstancy values are determined for spot colors of interest obtained from a library of spot colors on a DFE of a customer's device. A color inconstancy guide is generated from the spot colors and their respective color inconstancy values. As will become more apparent in the discussion hereof, the color inconstancy guide provides meaningful extensions in spectral color reproduction and color quality optimization in print/copy job environments by capturing spot color inconstancy values and providing those to device operators in a meaningful and readily useful manner.

It should be understood that one of ordinary skill in this art would be readily familiar with many facets of color science such as, but not limited to, color spaces, reflectivity, spectral reflectance, spectral printer models for color print applications, CIE illuminants for colorimetry, and other techniques and algorithms common in the color science arts. Additionally, one of ordinary skill would be familiar with advanced techniques used for color manipulation, color transformation, and various aspects of color measurement as those taught in: "Digital Color Imaging Handbook", $1^{st}$ Ed., CRC Press (2003), ISBN-13: 978-0849309007, and "Control of Color Imaging Systems: Analysis and Design", CRC Press (2009), ISBN-13: 978-0849337468, both of which are incorporated herein in their entirety by reference.

Non-Limiting Definitions

A "job" refers to a logical unit of work in a document reproduction environment.

A "print/copy job" refers to a print job or a copy job processed on a document reproduction device. Example print/copy jobs include images (black/white or color), papers, documents, brochures, magazines, newspapers, photos and film, and the like.

Figure 12:
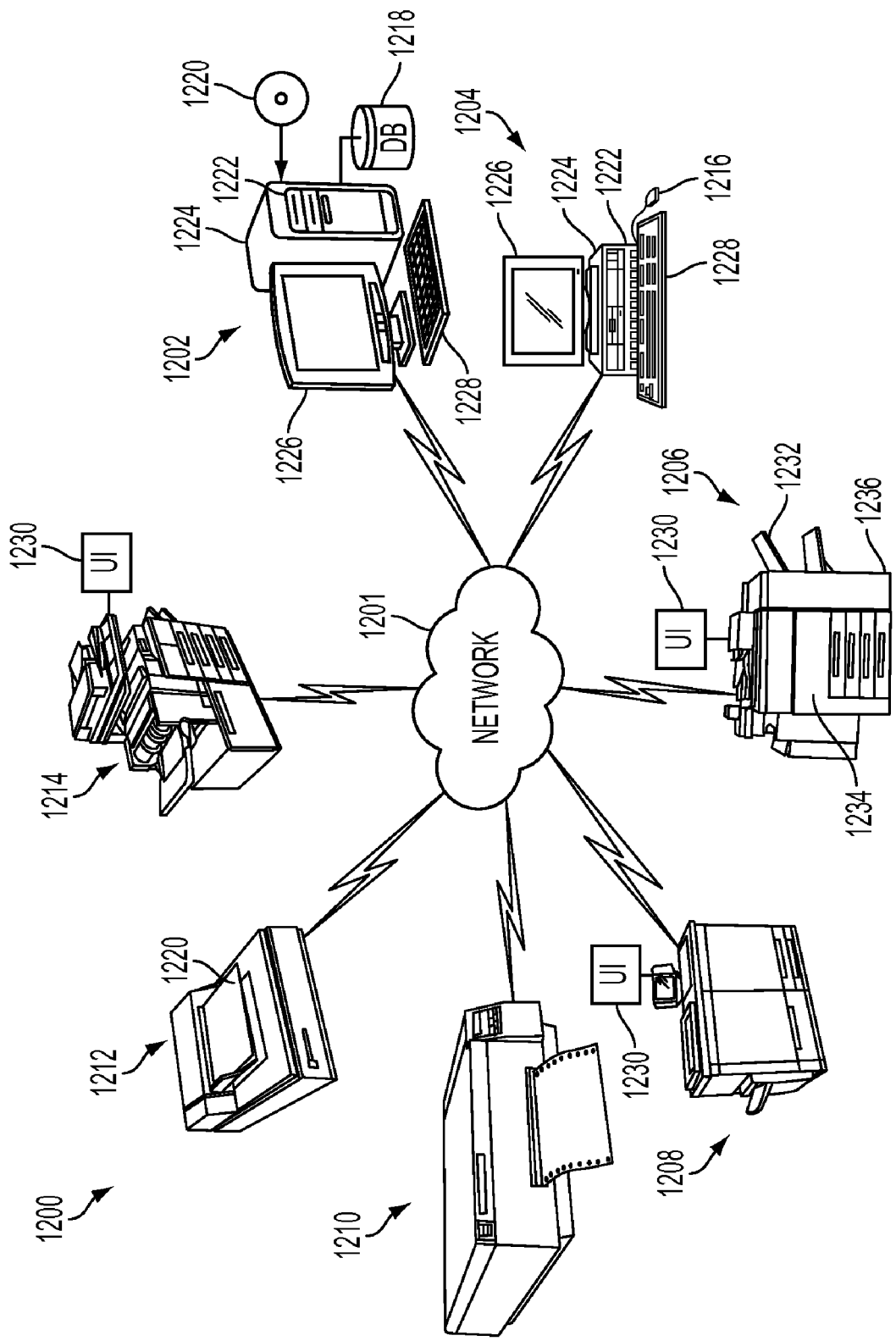
FIG. 12 illustrates one embodiment of an example networked print/copy job environment wherein various embodiments of the present color inconstancy guide for spot color applications can be performed.

A "print/copy job environment" is a document reproduction environment, as illustrated by example in the example networked environment of FIG. 12, wherein a print/copy job is rendered to a hardcopy using for example, a printer, copier, or other marking device capable of rendering an image onto a media type. The terms "document production" and "document reproduction" are used interchangeably and are intended to mean the production of new documents and the reproduction of existing documents.

"Media type" refers to a surface on which a print/copy job is rendered. Media types typically found in a print/copy job environment can be defined by a set of attributes such as type, size, color, weight, etc. For instance, one media type can have an attribute such as: plain, lightweight, recycled, mylar, transparency, etc. A media type can have a size attribute such as: letter, legal, executive, A4, A5, A6, etc. A media type can have a color attribute such as: blue, green, yellow, etc. Values such as: lb, gsm, etc., can be associated with a weight attribute. For example, the media type "A4 paper" may have the attributes: type-plain; size-21.0 cm×29.7 cm; color-white; weight-90 gsm.

An "image output device" is any device capable of rendering an image. The set of image output devices includes color marking devices such as, for instance, digital document reproduction device and other xerographic systems, photographic production and reproduction equipment as are widely known in commerce. An inkjet printer is one example image output device which receives a signal of an image and reduces the image to a viewable form by the visual integration of inks deposited onto a surface of a media substrate. An image output device includes various display devices such as monitors, projectors, holographic systems, and the like, which are also capable of rendering an image.

To "render" is to transform a signal of an image from one state to another such as, for example, receiving a signal of an image and reducing that signal to a viewable form such as a hardcopy print of the image. Rendering is also intended to include storing images to a memory or storage device, or otherwise communicating the image signal to another device such as a storage device. Such communication may take the form of transmitting, wirelessly or via a wire or cable, the image signal over a network such as a LAN or Internet.

A "storage device" refers to any device or system capable of storing electronic representations of documents or images. One example storage device is a database, as are well known in the arts, placed in communication with a computer system, workstation, server, or other device, that is either remote from or collocated with the device hosting a computing process that accesses and/or stores documents. Storage devices include RAM, ROM, cache memory, CD-ROM, DVD, flash drives, USB devices, internal/external hard drives, and other media or devices capable of storing electronic documents or images thereof.

"Illuminant" (or "Illumination") refers to standardized light source as defined by the International Commission on Illumination (CIE). The CIE publishes well-known standard illuminants, each of which known by a letter or by a letter-number combination. Illuminants of the A-series represent typical, domestic, tungsten-filament lighting with a correlated color temperature (CCT) of approximately 2856K. Illuminants of the B and C-series are daylight simulators. Illuminants of the D-series are natural daylight sources with D50, D55, D65 and D75 being common illuminants with CCT of approximately 5000K, 5500K, 6500K, and 7500K, respectively. At present, no artificial natural daylight source is recommended to realize CIE standard illuminant D65 or any other D-series illuminant of different CCT. Illuminants of the E-series are equal-energy illuminants. Illuminants of the F-series are fluorescent lamps of various compositions. F1-F6 are standard fluorescent lamps that consist of two semi-broadband emissions. F7-F9 are broadband fluorescent lamps with multiple phosphors. F10-F12 are narrow tri-band illuminants. One of ordinary skill would appreciate the use of illuminants in a spectral reflectance context.

A "standard observer" (also known as the "2° standard observer") refers to the CIE (1931) Standard Colorimetric Observer which defines a "standard observer" based upon studies with respect to chromatic responses of the human visual system viewing an object through a 2° angle (due to the original belief that the color-sensitive cones in the human eye all resided within a 2° arc of the fovea). A more modern, but less-used alternative, is the CIE 1964 10° Standard Observer which is recommended for more than a 4° field of view. Both the 1931 and 1964 standards are at discrete intervals of 5 nm wavelengths.

"CIELAB space" is an opponent-type color space, based on the opponent-color theory used to describe or model human color vision. In a color-opponent system, colors are mutually exclusive. For example, a color 'a' cannot be red and green at the same time, or yellow and blue at the same time. However, a color can be described in terms of red and blue, for example, purple. In a three-dimensional Euclidian coordinate view of opponent-type CIELAB color space, the two opponent coordinate axes are represented by a* and b* and describe the chromatic attributes of color. The a* axis represents the red-green coordinate. The b* axis represents the yellow-blue coordinate. Positive values of a* denote red colors. Negative values of a* denote green colors. Similarly positive values of b* represent yellows and negative values signify blues. The a* and b* coordinates are correlated to the postulated corresponding channels in the human visual system. The L* coordinate defines the perceptual correlate of a color's "psychometric lightness". Lightness is defined as the attribute of a visual sensation according to which the area in which the visual stimulus is presented appears to emit more or less light in proportion to that emitted by a similarly illuminated area perceived as a "white" stimulus. Lightness is an attribute of visual sensation that has meaning only for related visual stimuli, and may be referred to as "relative brightness". L* is in the range of 0 to 100. The central L* axis of the CIELAB color space lies perpendicular to the a*, b* plane and achromatic or neutral colors (black, grey, and white) lie on the L* axis at the point where a* and b* intersect (a*=0, b*=0). Colors specified as tristimulus values X, Y, and Z, can be located in Euclidian CIELAB space according to well-defined formulae.

"Tristimulus values" are the amounts of three primary colors (sets of colors that can be combined to make a useful range of colors) in a three-component additive color model needed to match a given test color. Tristimulus values are most often given in the CIE XYZ color space (1931) which serves as a basis from which many color spaces are defined. The CIE XYZ color space was deliberately designed so that the Y is a measure of the brightness or luminance of a color. Tristimulus values can be calculated using color-matching functions for a particular source of illumination if the reflectance spectrum of a given color sample is known. Alternatively, tristimulus values (XYZ) of a color may be directly measured by a tristimulus-filter colorimeter. If two color stimuli have the same tristimulus values, they will appear the same under the same viewing conditions by an observer whose color vision is not significantly different from that of a standard observer. The two color stimuli will produce what is called a "metameric" match between colors. Thus, colors with identical tristimulus values viewed under identical conditions provide the common and device independent link between differing color reproduction technologies.

The tristimulus values (XYZ) for standard illuminant D50 are computed, in one embodiment, using the following:

$$X = 100 \frac{\sum_\lambda R(\lambda) D_{50}(\lambda) x(\lambda)}{\sum_\lambda D_{50}(\lambda) y(\lambda)}$$

$$Y = 100 \frac{\sum_\lambda R(\lambda) D_{50}(\lambda) y(\lambda)}{\sum_\lambda D_{50}(\lambda) y(\lambda)}$$

$$Z = 100 \frac{\sum_\lambda R(\lambda) D_{50}(\lambda) z(\lambda)}{\sum_\lambda D_{50}(\lambda) y(\lambda)}$$

$R(\lambda)$=Reflectance spectra
$D_{50}(\lambda)$=Standard illuminant
$\lambda$=[380 730]
$x(\lambda)$, $y(\lambda)$, $z(\lambda)$, are color matching functions The tristimulus values (XYZ) for a given color with a spectral power distribution $I(\lambda)$ given in terms of a standard observer, is defined by:

$$X = \int_0^\infty I(\lambda) \bar{x}(\lambda) d\lambda,$$

$$Y = \int_0^\infty I(\lambda) \bar{y}(\lambda) d\lambda,$$

$$Z = \int_0^\infty I(\lambda) \bar{z}(\lambda) d\lambda,$$

where $\lambda$ is the wavelength of the equivalent monochromatic light (in nanometers), and $\bar{x}(\lambda)$, $\bar{y}(\lambda)$, $\bar{z}(\lambda)$ Re the CIE (1931) defined color matching functions which can be thought of as the spectral sensitivity curves of three linear light detectors that yield the CIE XYZ tristimulus values X, Y, and Z The relationship between L*a*b* values and the tristimulus values (XYZ) is defined, in one embodiment, by the following:

$$L^* = 116 \left[ f\left(\frac{Y}{Y_n}\right) - \frac{16}{116} \right]$$

$$a^* = 500 \left[ f\left(\frac{X}{X_n}\right) - f\left(\frac{Y}{Y_n}\right) \right]$$

$$b^* = 200 \left[ f\left(\frac{Y}{Y_n}\right) - f\left(\frac{Z}{Z_n}\right) \right]$$

$$f(x) = \begin{cases} x^{\frac{1}{3}} & \text{if } x \geq 0.008856 \\ 7.787x + \frac{16}{116} & x \leq 0.008856 \end{cases}$$

where $X_n$, $Y_n$, $Z_n$, are tristimulus values for the reference white.

A "spot color" is any color generated by an ink (pure or mixed) that can be printed using a single run. Spot colors are used to reproduce colors that are difficult to produce using standard inks. Many widely-used print processes are composed of four spot colors: Cyan (C), Magenta (M), Yellow (Y), and Black (Key), commonly referred to as CMYK. More advanced hexachromatic print processes are composed of six spot colors, which add Orange (O) and Green (G) to the four-color process (collectively termed CMYKOG). The two additional colors (OG) are added to compensate for the often inefficient reproduction of faint tints using only CMYK colors. Known spot color classification systems include: Pantone®, Toyo, DIC, ANPA, GCMI, and HKS. A common standard reference for spot color work is Pantone®. Spot color proofs are typically supplied in the form of colored samples which can be separated and individually measured.

A "spot color of interest" is intended to refer to all or a subset of spot colors in a library of spot colors available on a digital front end (DFE) of a given image output device. A spot color of interest is intended to also cover non-standard spot colors that may come from looking at prints from hardcopy samples which may have been printed with any known printing technology (e.g., offset lithographic, gravure, flexography, xerography, inkjet etc).

A "spectral reflectance value" refers to a value obtained from one or more spectral reflectance measurements. Spectral reflectance or reflectance spectrum, is usually given as $R(\lambda)$, where $\lambda$ is the wavelength (in nanometers) of an equivalent monochromatic light. Spectral reflectance values can be retrieved from a storage device or measured using a reflectance spectrum measuring device, such as a spectroradiometer or spectrophotometer which samples a stimulus at a number of different wavelengths. Reflectance spectrum measurements may be obtained when a marking substance is in an intermediate state such as, for instance, when toner is adhered to a photoreceptor (belt, drum, etc.) prior to being transferred and fused to a media substrate.

"Color constancy" is the perceptual mechanism which provides humans with color vision which is relatively independent of the spectral content of the illumination of a scene. Color constancy works only if the incident illumination contains a range of wavelengths which can be registered by the different cone cells of the human eye. From this, the visual system attempts to determine the approximate composition of the illuminating light. This illumination is then discounted in order to obtain the object's "true color" or reflectance (wavelengths of light the object reflects). This reflectance largely determines the perceived color.

A "color inconstancy value" is a value calculated using a Color Inconstancy Metric which represents a degree of color inconstancy for a given spot color of interest.

A "Color Inconstancy Metric" is a metric for determining a color inconstancy value for a given spot color of interest using various embodiments of a Color Inconstancy Index, as more fully defined and described herein.

A "Color Inconstancy Index" (CII) is a measure of the undesirable change in color caused by changes in illumination. Described herein are a simplified embodiment of a Color Inconstancy Index, and a more rigorous embodiment of a Color Inconstancy Index. In a more simplified embodiment, the Color Inconstancy Index (CII) is calculated, for a given illuminant, as the color difference CIEDE2000 between the illuminant and a CIE standard illuminant D50. For example:

$$CII_i = \Delta E2000(LAB_i, LAB_{D50}),$$

where i=A, D55, D65, D75, and F1-F12.

The Color Inconstancy Index can be calculated across multiple illuminants, e.g., all illuminants in your database except for D50, and averaged. In this example, the average CII is the mean $CII_i$. For example:

$$CII\_avg = \frac{1}{n} \sum_i CII_i,$$

where i=A, D55, D65, D75, and F1-F12.

In a simplified embodiment, the Color Inconstancy Index for a given sample between D50 and D65 illuminants is given as:

$$CII=\sqrt{(L_{D50}-L_{D65})^2+(a_{D50}-a_{D65})^2+(b_{D50}-b_{D65})^2},$$

where the {L, a, b} values refer to color values corresponding to L*, a*, b* values, and where with suffixes corresponding to the illuminants used (D50 and D65).

In a more rigorous embodiment, the Color Inconstancy Index is determined according to the following: Calculate tristimulus values (XYZ), as more fully described above, under both a reference illuminant and a test illuminant from spectral reflectance values obtained for a color sample of interest to produce a pair of tristimulus values. Then, transform the pair of tristimulus values to CIE illuminant D65 using a Chromatic Adaptation Transform (CAT) such as, for example, CIECAT02 or the Bradford Chromatic Adaptation Transform, to model changes in illumination. Basically, applying a Chromatic Adaptation Transform to the tristimulus values (X'Y'Z') of a color under one adapting light source predicts the corresponding color's tristimulus values (X"Y"Z") under another adapting light source. More specifically, CATs provide a means to map XYZ under a reference illuminant to XYZ under a target illuminant such that the corresponding XYZ produce the same visually perceived color. The color science community has mostly adopted the linear von Kries model to compute this illumination change. This model states that the color responses of corresponding colors under two illuminants are simple scalings apart. If the color values under the two different illuminants are different, the total color difference, (expressed in terms of ΔE) between them is a measure of the color inconstancy for that sample under the two selected illuminants. Many CATs described in the literature are based upon the well-known von Kries model. CIE tristimulus values are linearly transformed by a 3×3 matrix $M_{CAT}$ to derive post-adaptation cone responses under the first illuminant, denoted as R'G'B'. The values of $M_{CAT}$ are transform dependent. The resulting R'G'B' values are independently scaled to get the post-adaptation cone responses R"G"B" under the second illuminant. The scaling coefficients are often based on the illuminants' white-point post-adaptation cone responses. If there are no non-linear coefficients, this transform can be expressed as a diagonal matrix. To obtain CIE tristimulus values (X", Y", Z") under the second illuminant, the R"G"B" are multiplied by $M^{-1}_{CAT}$, i.e., the inverse of matrix $M_{CAT}$ as follows:

$$\begin{bmatrix} X'' \\ Y'' \\ Z'' \end{bmatrix} = [M_{CAT}]^{-1} * \begin{bmatrix} R''_w/R'_w & 0 & 0 \\ 0 & G''_w/G'_w & 0 \\ 0 & 0 & B''_w/B'_w \end{bmatrix} * [M_{CAT}] * \begin{bmatrix} X' \\ Y' \\ Z' \end{bmatrix}$$

where $R'_w$, $G'_w$, $B'_w$ and $R''_w$, $G''_w$, $B''_w$ are computed from the tristimulus values of the first and second illuminants, respectively, by multiplying the corresponding XYZ vectors by $M_{CAT}$. In the von Kries model, $M_{CAT}$ is given as:

$$M_{vonKries} = \begin{bmatrix} 0.3897 & 0.6890 & -0.0787 \\ -0.2298 & 1.1834 & 00464 \\ 0 & 0 & 1 \end{bmatrix}.$$

Thereafter, calculate the Color Inconstancy Index between the two colors under D65 illuminant with a weighted color difference equation wherein a hue difference is penalized twice as much as lightness and chroma.

A color inconstancy value can be calculated for a printer type, media type, and a halftone screen. For example, let i, j, k, and l, represent the color, printer, media type, and halftone screen respectively. Then, the relationship:

$$x_{ijkl}=\{(CII\_\text{avg})_{ijkl},(CII\_95\%)_{ijkl},(CII\_\text{max})_{ijkl}\},$$

represents the color inconstancy for color i. A minimum value of $x_{ijkl}$ gives the most color inconstancy across that color, printer, media type, and halftone screen.

Example Flow Diagram

Figure 1:
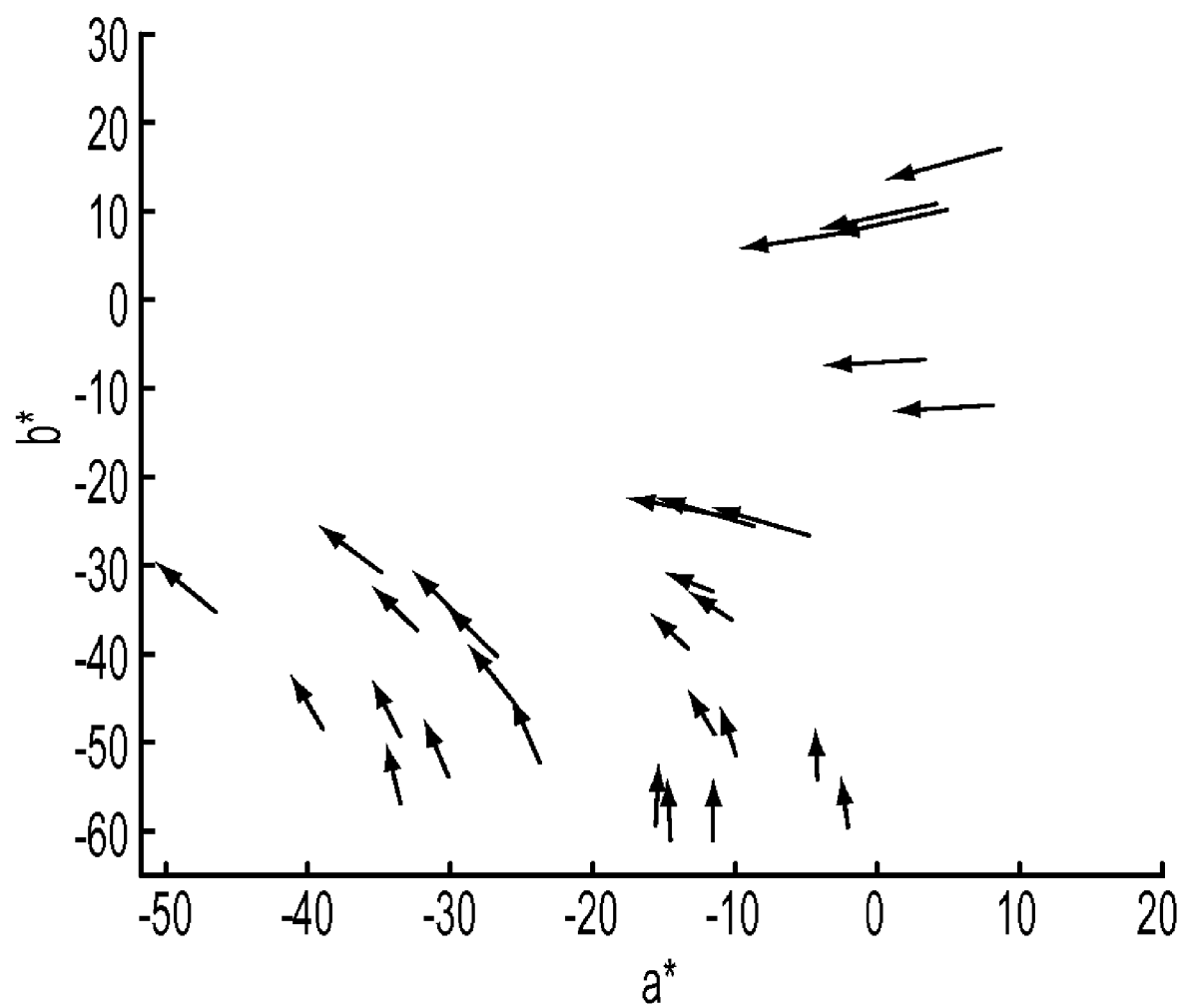
FIG. 1 is a plot showing print samples wherein the tail of the arrows represents the tristimulus values of prints under F11 illumination and the head of the arrows represents the tristimulus values under D50 illumination.
Figure 2:
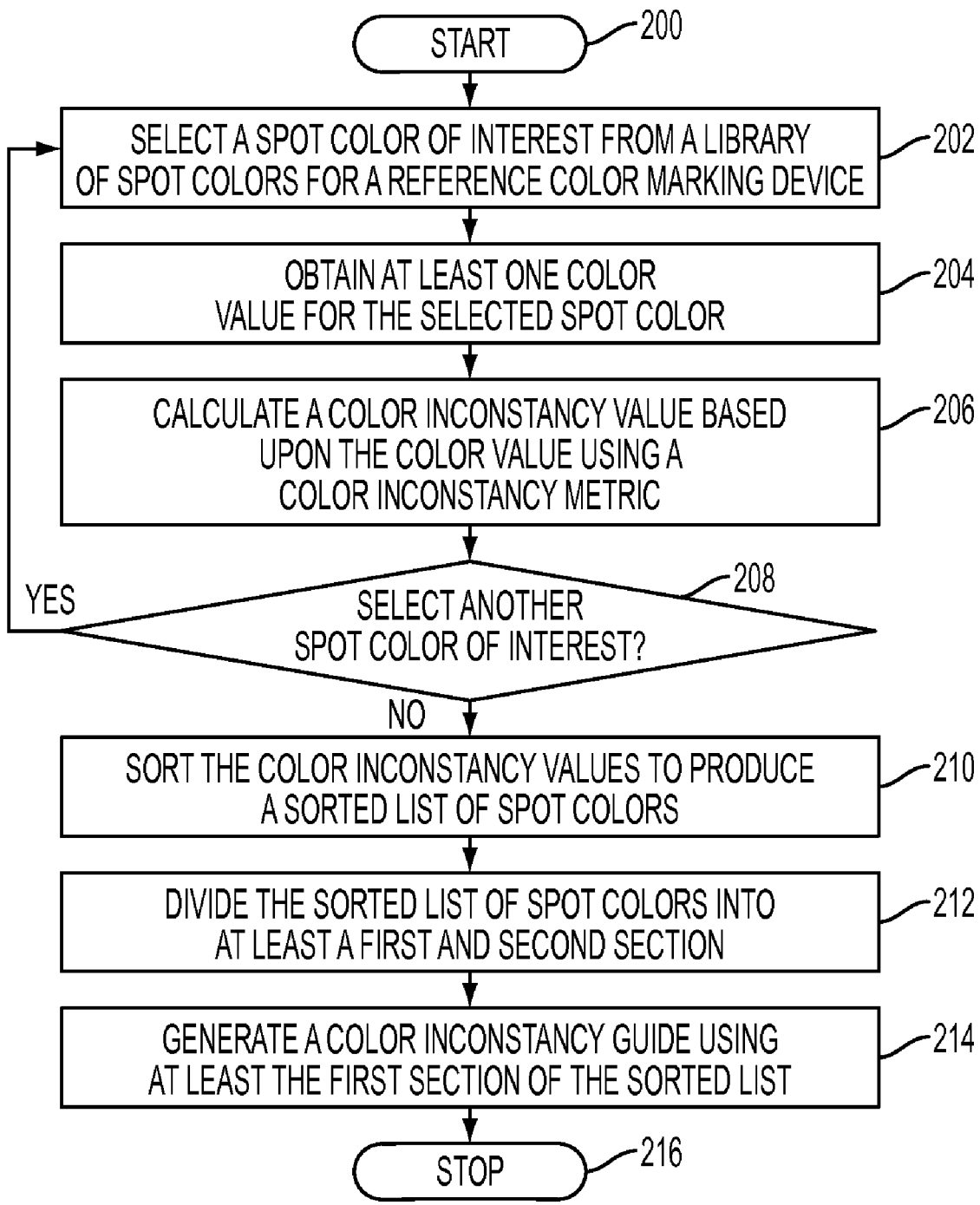
FIG. 2 is a flow diagram of one example embodiment of the present method for generating a color inconstancy guide for spot color print applications.

Reference is now being made to the flow diagram of FIG. 2 which illustrates one example embodiment of the present method for generating the color inconstancy guide for use in spot color print applications. The flow begins at 200 and immediately proceeds to 202.

At step 202, select a spot color of interest from a library of spot colors. In one embodiment, the library of spot colors comprises colors defined by a standard such as: Pantone®, Toyo, DIC, ANPA, GCMI, and HKS, which are capable of being rendered by the reference color marking device. The library of spot colors may also comprise non-standard user-defined colors. Some or all of the spot colors in the library may be of interest depending on the user's application and print/copy job environment. The library of spot colors may be retrieved, either one at a time or as a group, from a storage device such as database 1218 of FIG. 12, or obtained from a remote device over a network. In various embodiments, the retrieved spot colors are displayed a graphical display device such as a touchscreen device and the user selects all or a subset of the displayed spot colors. In such an embodiment, the user utilizes a user interface, such as a keyboard or mouse, to identify the library of spot colors for the reference color marking device. One or more records containing the identified user-selected library of spot colors are retrieved from the database in response to the user selection.

At step 204, obtain at least one color value for the selected spot color of interest. The color value can be obtained from spectral data defined by a standard, or from one or more spectral reflectance values obtained, for example, from a spectral printer model of the reference marking device or another device, or from spectral reflectance measurements. Spectral reflectance measurements may be obtained from printed test patches of the respective spot color of interest using a reflectance spectrum measuring device. A reflectance spectrum measuring device is a device for measuring a spectral reflectance value for a given spot color. Such devices are well known and are typically calibrated to a reference standard traceable to a national laboratory. Spectral reflectance values can be measured using, for example, a spectroradiometer which measures the spectral power distribution, or a spectrophotometer which measures a spectral reflectance of a sample under a given geometrical condition. One of ordinary skill will appreciate that spectral reflectance measurements obtained using spectrometers or like spectral reflectance measuring devices are subject to various sources of error such as, for instance, wavelength scale shifts, stray light, bandwidth, scanning interval, detector nonlinearity, and input optics imperfections. Uncertainties in such measurements depend not only on the type of instrument used but also how the instrument is set up and the measurements performed.

At step 206, calculate a color inconstancy value for the selected spot color of interest using any of the above-described embodiments of the Color Inconstancy Metric. The calculated color inconstancy value is based upon the color value(s) obtained in step 204. In one embodiment, calculating the color inconstancy value comprises calculating separate color inconstancy values for each illuminant and observer angle using the Color Inconstancy Metric, and averaging the separate color inconstancy values across both the illuminant and observer angle. Alternatively, the color inconstancy value is determined by calculating a color inconstancy for a printer type, a media type, and/or a halftone screen. The color inconstancy values, calculated for each respective spot color, may further be provided to a storage device such as storage device 1218 of FIG. 3 or communicated to a remote device such as a server or workstation over a network. Any interim values generated during the color inconstancy value computation may also be provided to a storage device for subsequent retrieval. In addition, values, formulas, and software routines needed for the calculation of the color inconstancy value for a given spot color of interest can be stored and retrieved from a storage device.

At step 208, a determination is made whether to select another spot color of interest for processing. If so, then processing proceeds back to step 202 wherein a next spot color of interest is selected. Processing repeats until a color inconstancy value has been determined for all selected spot colors of interest.

At step 210, sort the color inconstancy values to produce a sorted list of spot colors and their respective color inconstancy values. In one embodiment, the list is sorted from a lowest color inconstancy value to a highest color inconstancy value. In another embodiment, the sorting is from a highest color inconstancy value to a lowest color inconstancy value. Both sorting ways (highest-to-lowest or lowest-to-highest) are intended to fall within the scope of the appended claims. The association of spot colors with their respective color inconstancy value is retained during sorting. Methods for sorting a list of numerical values with associated fields are well established. The sorted list can be stored to a storage device or up-loaded over a network to a remote device such as a database or a computer system. The sorted list of color inconstancy values can further be displayed on a graphical user interface for a user to review. Optionally, the user can use a graphical display to manipulate the sorted list by, for example, adding additional information to the list, removing existing values from the list, or editing any of the color inconstancy values or spot colors on the list.

At step 212, divide the sorted list of spot colors and their respective color inconstancy values into at least a first and a second section. The first section of the sorted list comprises spot colors with lower color inconstancy values. Spot colors with lower color inconstancy values are determined to be substantially similar when viewed under different illuminants when rendered on different color marking devices. In other words, spot colors in the first section have a higher likelihood of color constancy. Spot colors of the second section have higher color inconstancy values. Spot colors with higher color inconstancy values are determined to have an increased likelihood of color inconstancy, as defined herein. In one embodiment, spot colors of the first section of the sorted list have an associated respective color inconstancy value less than or equal to 1.0. Spot colors which have an associated respective color inconstancy value greater than 1.0 reside in the second section of the sorted list. It should be understood that a numerical value other than 1.0 used to divide the sorted list of calculated color inconstancy values into a first and second section are intended to fall within the scope of the appended claims. In various embodiments, all or portions of the sorted list of color inconstancy values are displayed on a graphical display device, such as a touchscreen. In such an embodiment, a user selects or otherwise enters a desired numerical value which divides the sorted list into a first and second section. Such a user selection may be based upon an experience level with different print devices, different media types, and different halftone screens. In other embodiments, the numerical value which divides the sorted list of color inconstancy values into a first and second section is determine by other means. Such other means may include further computation or may be as simple as, for example, the existence of a "break" or "gap" in the sorted list of color inconstancy values which divides the sorted list into a first and second section.

Embodiments which divide the sorted list of color inconstancy values into a plurality of different sections are also intended to fall with the scope of the appended claims. For instance, the sorted list may be divided into a first section containing spot colors with low (or very low) color inconstancy values, a middle section, and a last section of spot colors which have high (or very high) color inconstancy values. Spot colors in a middle section may be deemed to have "intermediate" inconstancy values which may or may not have an increased likelihood of color inconstancy. Spot colors residing in such a middle section of the divided list may require further determination. Whereas, spot colors of the last section may have color inconstancy values that are deemed to be "dangerous" or "at risk" when used on a particular color marking device. In other embodiments, only spot colors residing in the first section are retained and spot colors in the middle and last section are discarded or disregarded. Some or all of the color inconstancy values and their respective spot colors of interest may be provided to a storage device for storage and subsequent retrieval. Some or all of the color inconstancy values and their respective spot colors of interest may be communicated to a remote device over a network for display, storage, and/or further processing.

At step 214, generate a color inconstancy guide using at least a portion of the first section of the divided sorted list. The color inconstancy guide may include all sections of the divided sorted list. Various sections of the divided list may have a mark or border which visibly demarcates the sectional divisions. Headings and other information may be further provided with one or more sections. In various embodiments, generating the color inconstancy guide comprises printing some or all of the color inconstancy values and their respective spot colors in the divided sorted list. Generating the color inconstancy guide may comprise communicating one or more color inconstancy values and their respective spot colors over a network to a remote device, such as for example, a computer system or workstation. Generating the color inconstancy guide may also comprise storing the sorted color inconstancy values and their respective spot colors to a storage device and/or displaying all or a portion of the sorted list for a user review. Thereafter, processing stops at 216.

The hardcopy color inconstancy guide can then be provided to the customer for use in their respective print/copy job environments. When the customer thereafter desires to render a particular print/copy job in a selected spot color of interest, the associated color inconstancy value for that spot color can be obtained from the color inconstancy guide. The user can determine from the color inconstancy guide what the calculated color inconstancy value for the selected spot color is. In response to a user query, for example, a range of color inconstancy values are retrieved from the stored color inconstancy guide. The retrieved color inconstancy values are displayed on a display device for the customer. The user can then select one or more spot colors based upon the displayed color inconstancy values.

The color inconstancy guide generated in accordance herewith has other uses for customers in their respective print/copy job environments. For example, in soft proofing applications, the customer selects a spot color from the color inconstancy guide, calculates L*a*b* values for the selected spot color using a reference illuminant and observer angle, and then prints the calculated L*a*b* values on a DFE display. In another embodiment, the stored color inconstancy guide is queried by the device itself, in response to a spot color having been selected by the user for a given print/copy job to obtain that spot color's respective color inconstancy value. If the spot color's respective color inconstancy value is determined to be above a pre-defined value determined, for instance, by a standard or by the manufacturer of the device, a notification can automatically be provided by the device to the user that the chosen spot color has an increased likelihood of color inconstancy. In instances wherein various embodiments of the present system and method are integrated with one or more device controllers, the device itself further initiates pre-defined protocols which, in turn, activate on or more device controllers to prevent the print copy/job from continuing using the present spot color selection. In such an embodiment, recommendations and other assistance can be displayed or otherwise provided to the user or operator of the device. Such audio, video, or displayed recommendations may take the form of a better spot color to use for improved color constancy, a printer to use, a recommended media type, and/or a halftone screen to use. These recommendations can be manually added to the records of the color inconstancy guide or embedded in a recommendations list associated with the spot colors of the first section of the sorted list. Such notifications may be automatically emailed or otherwise communicated to a manager of the print/copy job environment or, for instance, an engineer or manufacturer's representative, or the like.

In such a manner, the present color inconstancy guide provides meaningful extensions in color reproduction and color quality optimization in diverse print/copy job environments by capturing color inconstancy values and providing them to a user in a meaningful and useful manner.

Example Functional Block Diagram

Figure 3:
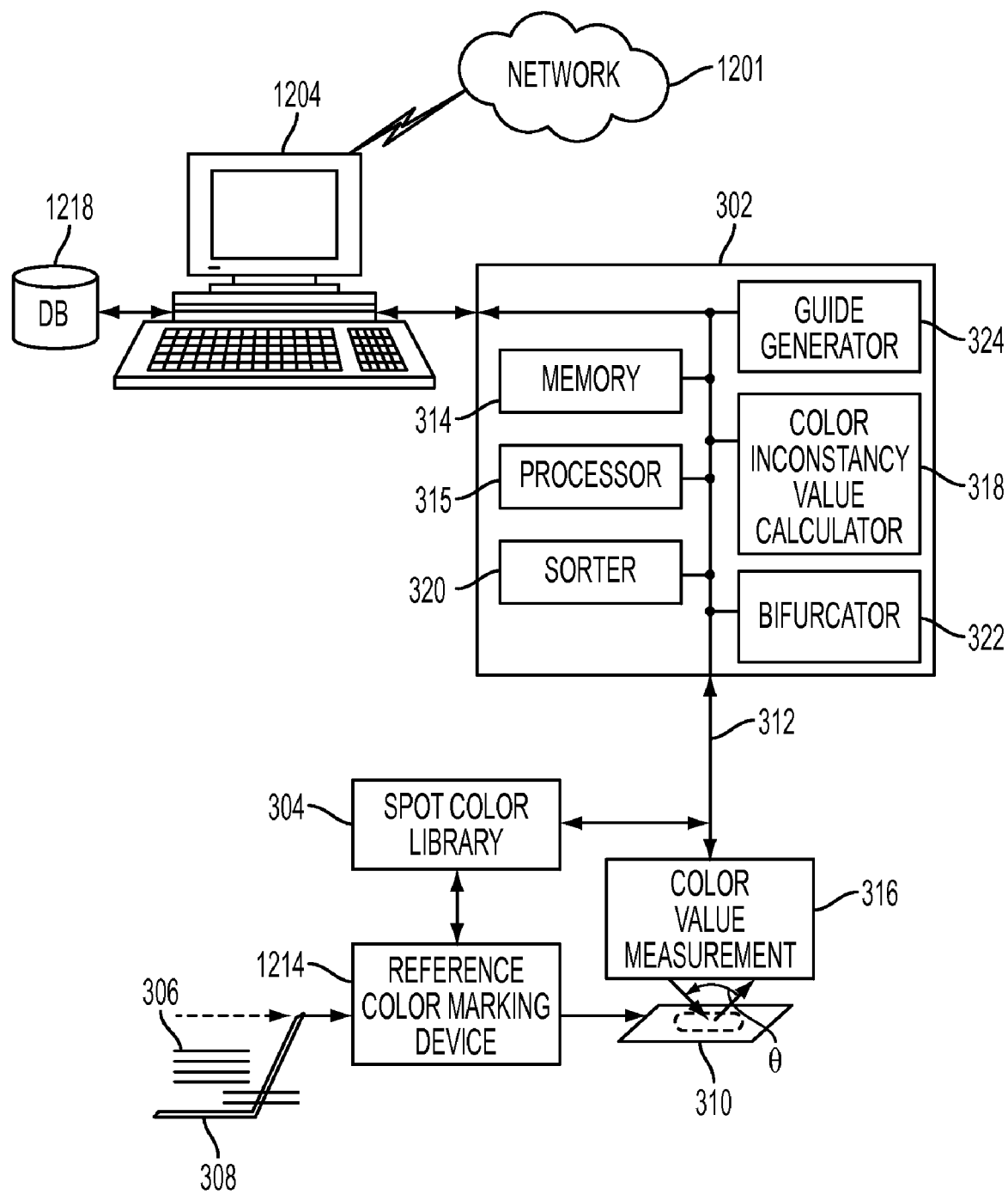
FIG. 3 is a functional block diagram of one example embodiment of the present system and method for generating a color inconstancy guide in accordance with the flow diagram of FIG. 2.

Reference is now being made to FIG. 3 which is an example block diagram of one embodiment of the present system and method for generating a color inconstancy guide for spot color printing applications. The embodiment of FIG. 3, is shown generally comprising elements of the example networked document reproduction environment of FIG. 12. Some elements of FIG. 3 are similarly labeled to corresponding elements of FIG. 12 and thus a repeat discussion as to these elements has been omitted.

In FIG. 3, computer system 1204 is shown in communication with database 1218 and network 1201, in a manner as previously described, and further in communication with processing block 302 wherein various features and embodiments of the present method, as described with respect to the flow diagram of FIG. 2, are performed. Media type 306 is retrieved from media storage area 308 and provided to reference color marking device 1214 whereon a spot color from spot color library 304 is printed. In this embodiment, the library of spot colors 304 is for the reference color marking device 1214. The media marked with the spot color of interest (shown generally at 310) is then, in this particular embodiment, provided to color measuring device 316 where at least one color value is obtained using a known illuminant, such as D50, and an observer angle θ. The obtained color value(s) and the respective spot color of interest are provided via communication pathway 312 to processing block 302 wherein the values are stored in memory 314. The process repeats for each selected spot color of interest in the library 304, in a manner as previously described with respect to the flow diagram of FIG. 2. Inside processing block 302, processor 315 retrieves the obtained color values from memory 314 and provides the color values, either serially or in parallel, to color inconstancy calculator 318 wherein a color inconstancy value is calculated for each respective spot color of interest using any of the previously described Color Inconstancy Metrics. Color inconstancy calculator 318 may utilize memory 314 as storage or may further access information and other data from database 1218, and software routines from computer 1204, or from a remote device over network 1201. After the color inconstancy values have been calculated for each respective spot color of interest, the color inconstancy values are provided to sorter 320 wherein the color inconstancy values are sorted from a lowest to a highest value. The sorted list is provided to bifurcation unit 322 wherein the sorted list is divided into at least a first section of spot colors having color inconstancy values which are less than a predetermined value such as, for example, 1.0, and at least a second section of spot colors having respective color inconstancy values greater than or equal to 1. Spot colors not in the first section are determined to have an increased likelihood of color inconstancy and are thus, as will be described more fully with respect to FIGS. 4-11, not well suited for rendering using color marking device 1214. Sorted list bifurcation unit 322 can, in various embodiments, receive a bifurcation value from a user input via user interface of computer system 1204. The sorted bifurcated list is provided to guide generator 324 wherein, using an image output device, at least the first section of the sorted bifurcated list to reduced to a hardcopy. Guide generator 324 may further provide the sorted bifurcated list over network 1201 to any of the devices discussed with respect to the networked environment of FIG. 12. Guide generator communicates at least the first section of the sorted bifurcated list. Guide generator, in response to a user input, may further store at least the first section of the sorted bifurcated list to a storage device such as, for example, database 1218, or display at least a first section of the sorted bifurcated list to the graphical display of computer system 1204.

It should be appreciated that a "module" or "processing block" or "unit" refers to a system component comprised of software or hardware, or a combination of both, which performs a certain function, as will be explained herein further. A plurality of such modules may collectively perform a function. A module may be implemented using a single software program comprising, in part, machine readable program instructions, or a single piece of hardware such as, for example, an ASIC, electronic circuit, or special purpose processing system such as the special purpose computer of FIG. 17. A plurality of modules may be executed by either a single system or a plurality of systems operating in parallel. Connections between modules may include both physical and logical connections. The term "system" includes one or more software and/or hardware modules which may further comprise an operating system, device drivers, device controllers, and other apparatuses, some or all of which may be connected via a network.

Avg CII Values for Example Print Offset and iGen4 Devices

Figure 4:
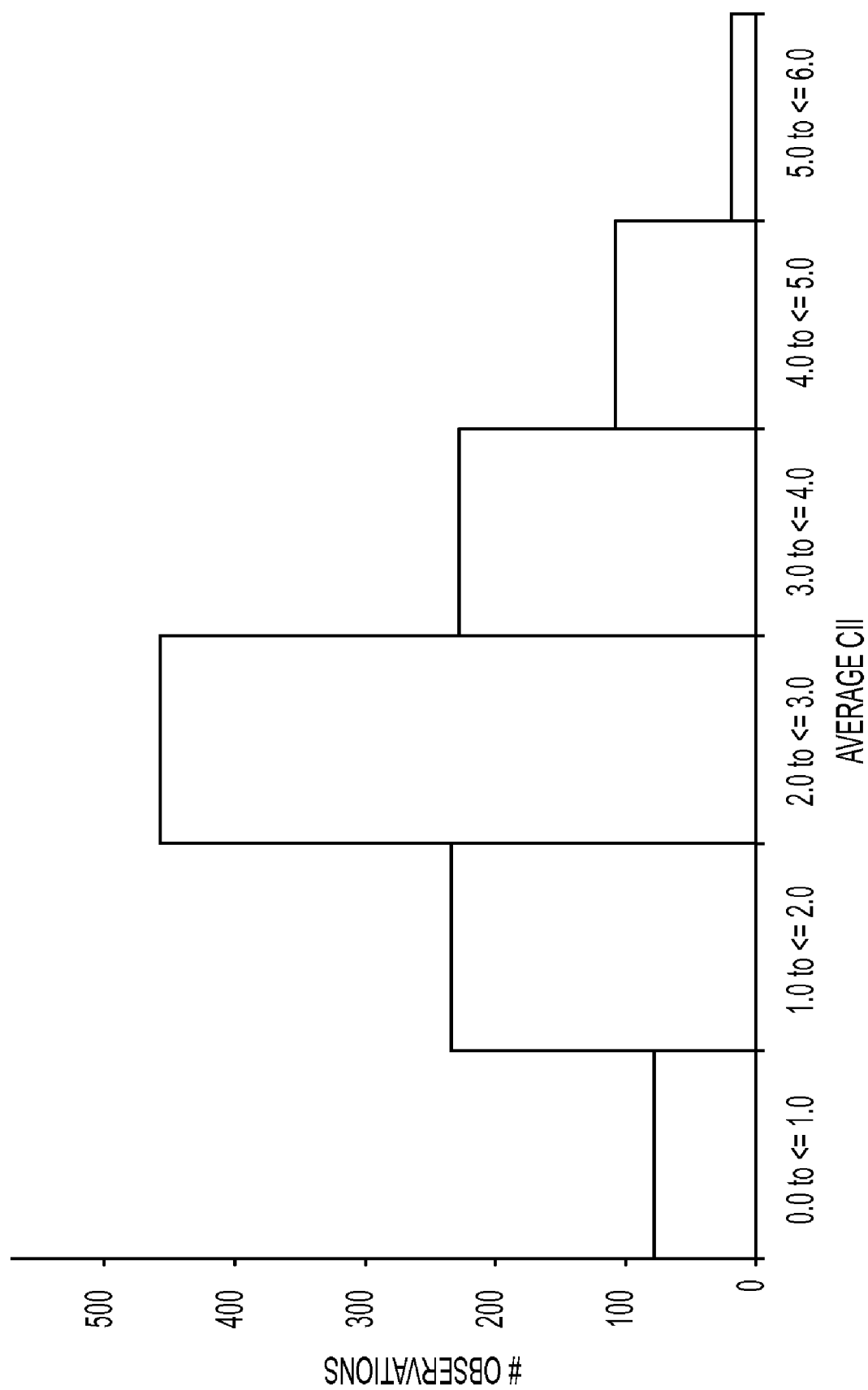
FIGS. 4-6 show the histogram of the average, 95% percentile, and maximal Color Inconstancy Index (CII) over multiple illuminants, for all 1124 Pantone® colors for an Offset Printer.
Figure 5:
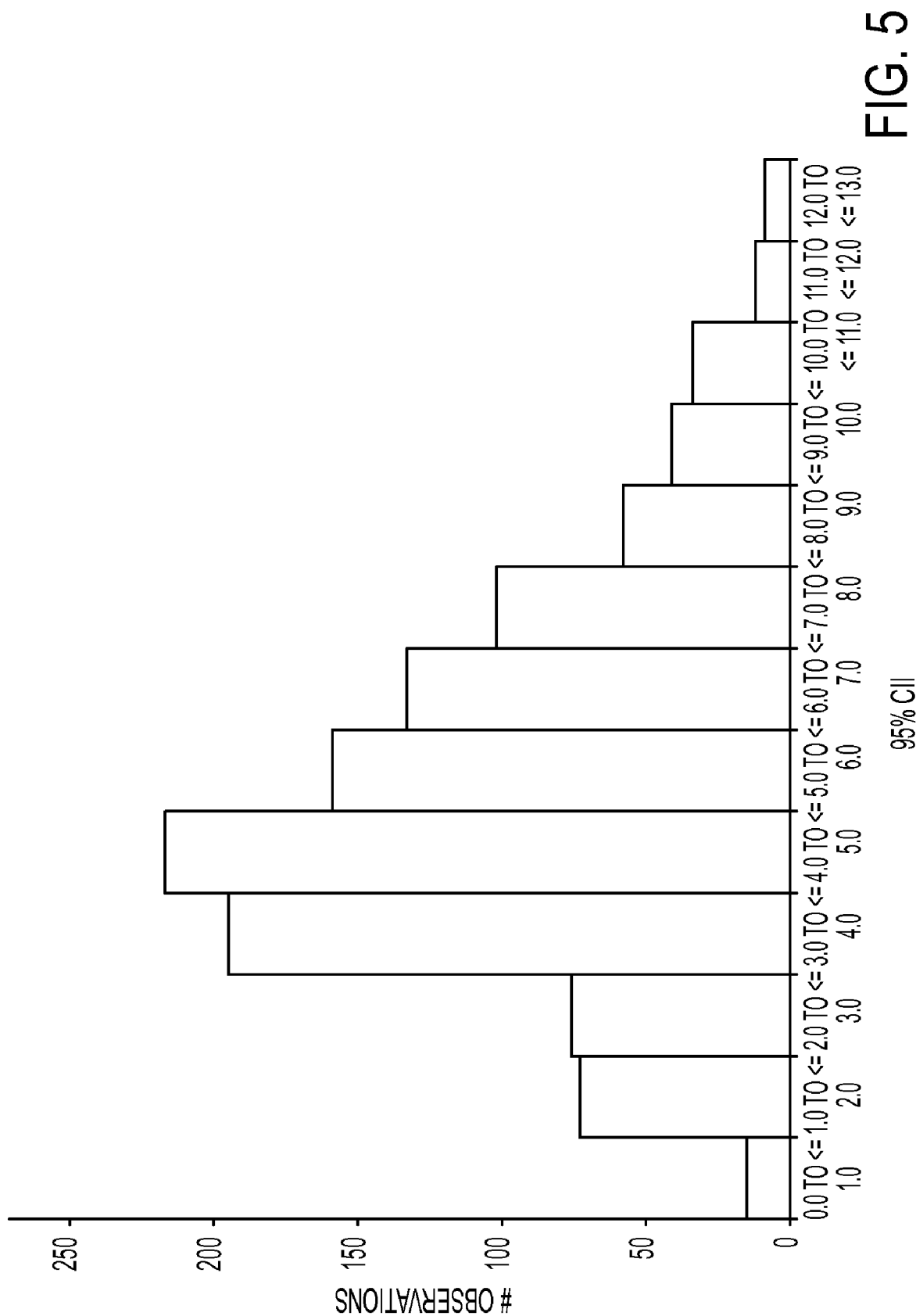
Figure 6:
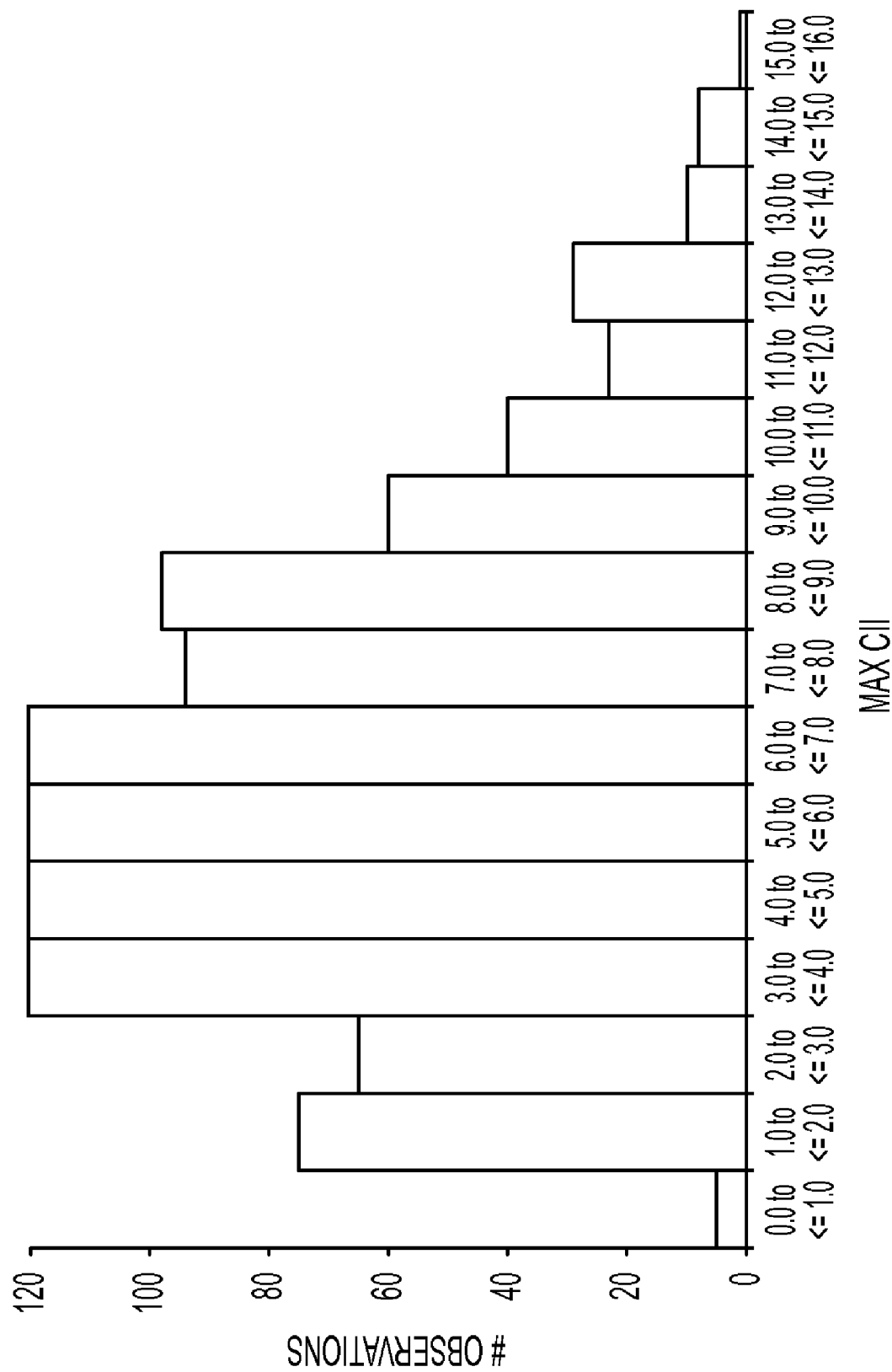
Figure 7:
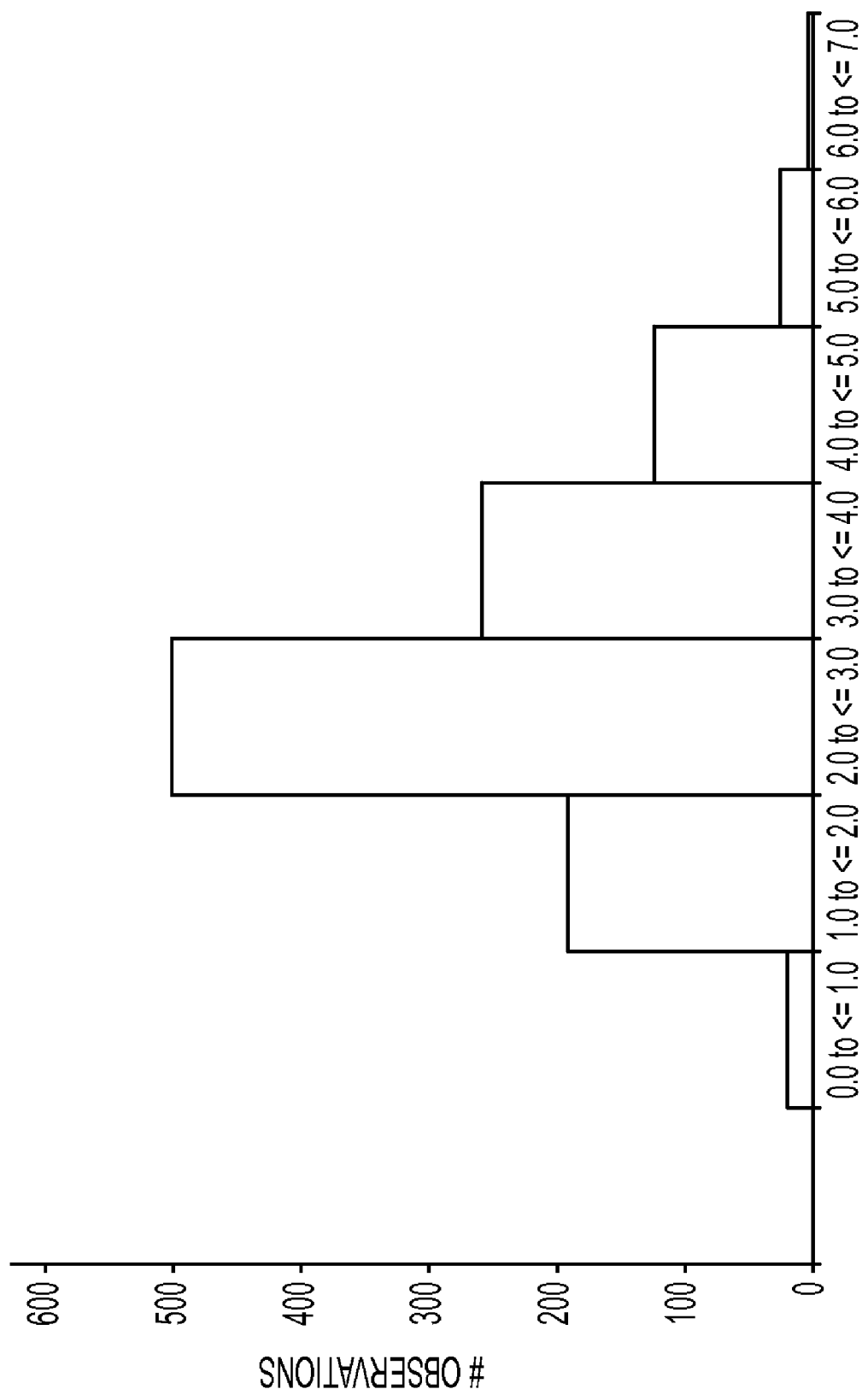
FIGS. 7-9 show a histogram similar to the histograms of FIGS. 4-6 for all 1124 Pantone® colors for an iGen4 printer.
Figure 8:
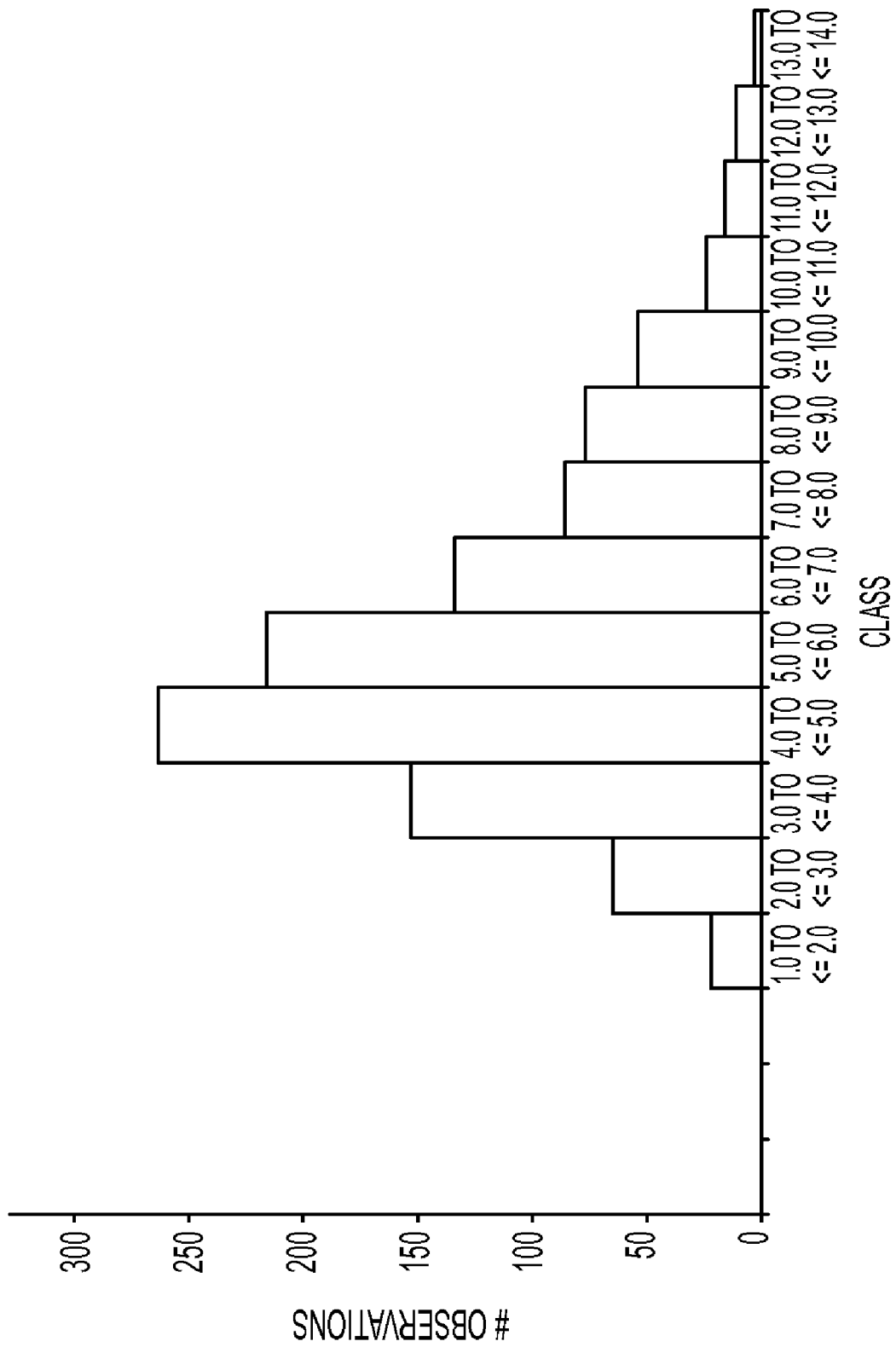
Figure 9:
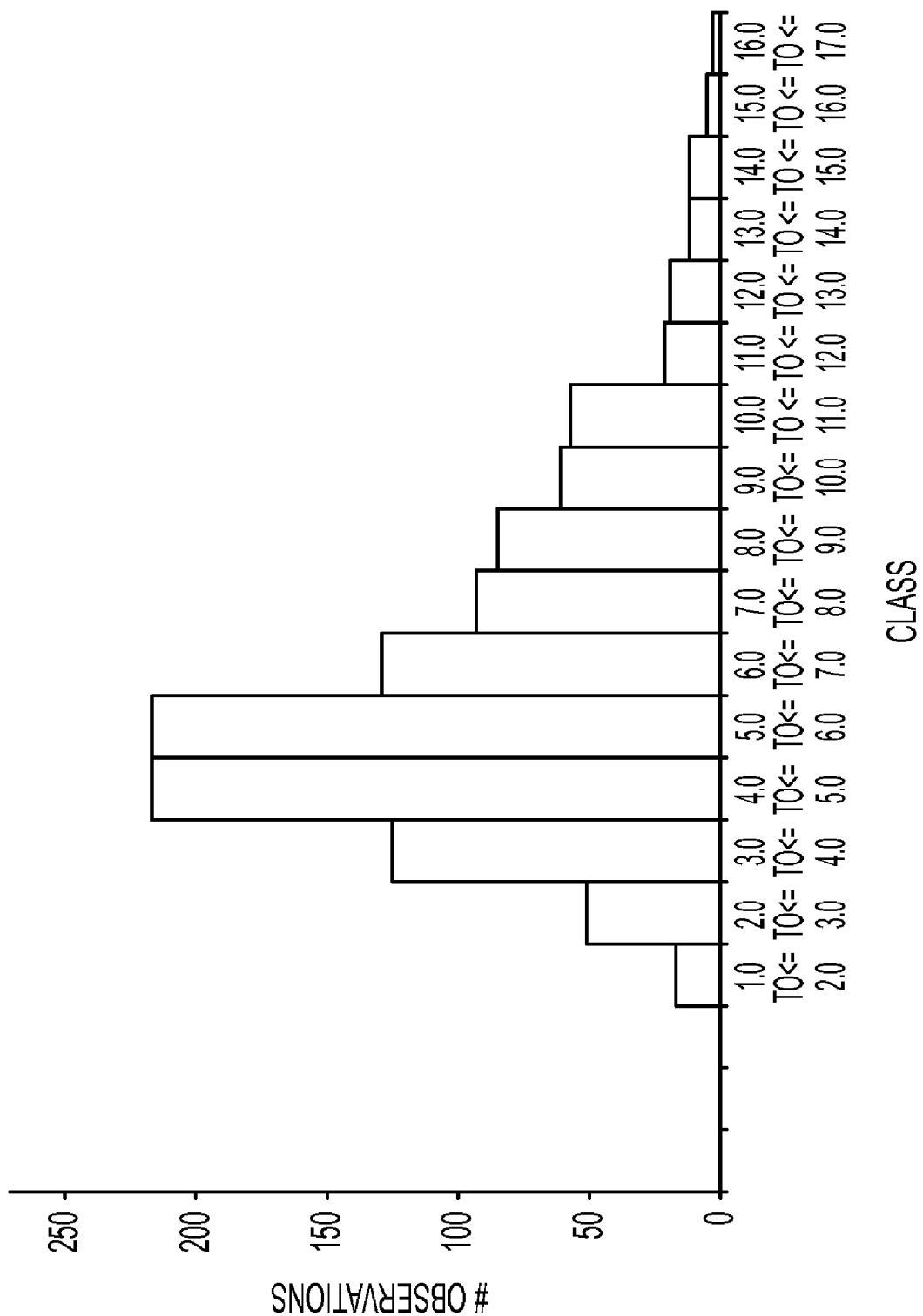

FIGS. 4-6 show the histogram of the avg, 95%, and max CII, for 1124 Pantone® colors for an Offset Printer, and FIGS. 7-9 show a histogram similar to the histograms of FIGS. 4-6 for 1124 Pantone® colors for an iGen4 printer. It was found that only 78 (6.94%) spot colors had average CII less than 1.0 for a reference printer and only 20 (1.78%) spot colors for iGen4. Whereas 312 (27.75%) had average CII less than 2.0 and 212 (18.86%) for iGen4. If the target is average CII=1.0, then large number of spot colors in the library exhibit very high color inconstancy across all the illuminants for iGen4. This number would be certainly different for other printers.

Figure 11A:
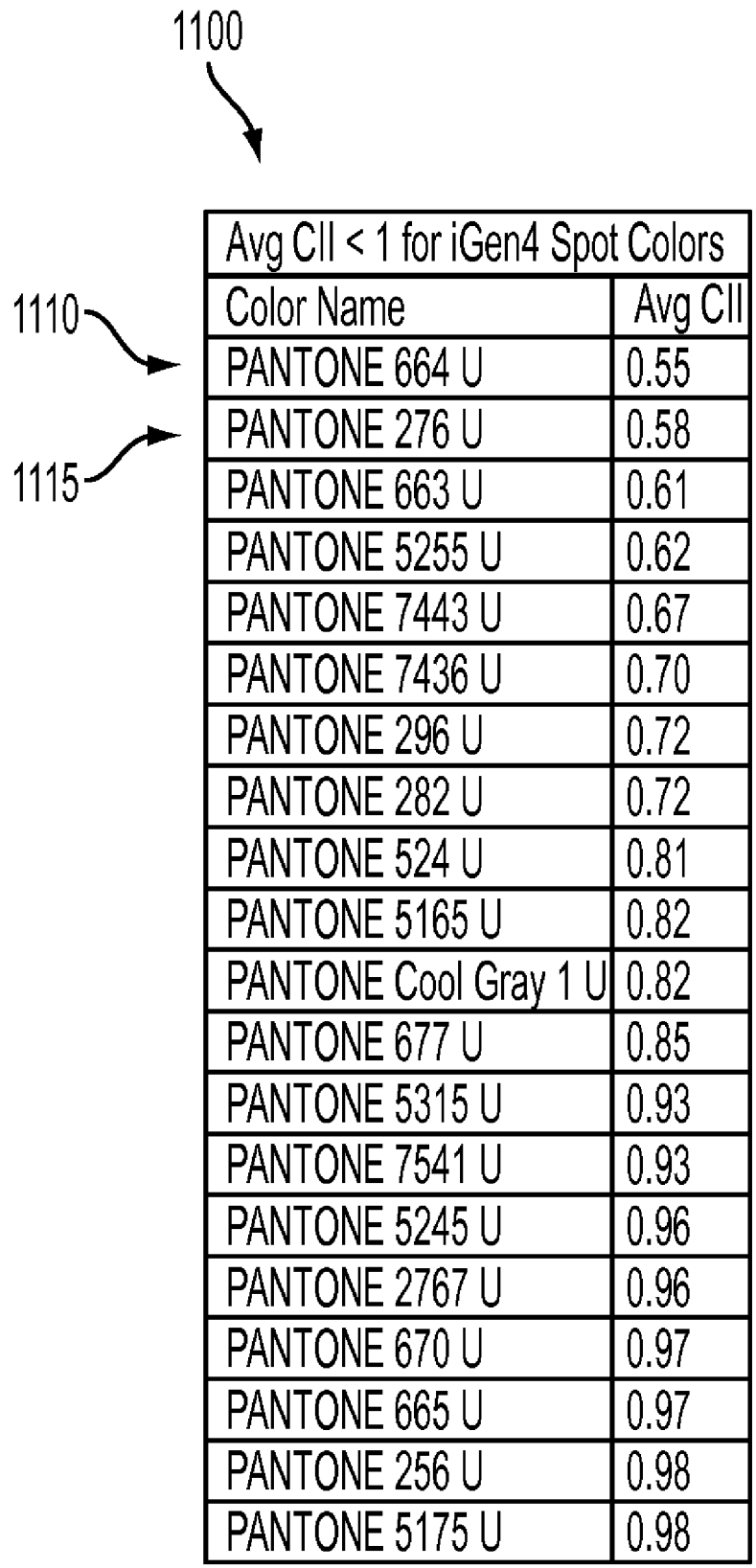
FIG. 11A is an example color inconstancy guide generated for an iGen4 with the sorted list having been divided into a first section of spot colors having an average CII value of less than 1.0.
Figure 11B:
FIG. 11B shows a sorted list of spot colors having an average CII value of greater than 5.0 generated for an iGen4, for explanatory and comparison purposes.

FIGS. 10A-B and FIGS. 11A-B show example sorted lists of color inconstancy values for Pantone® spot colors generated using an Offset Printer and an iGen4, respectively, using an average CII as the Color Inconstancy Metric in accordance with the teachings hereof. Each of these two sorted lists of color inconstancy values and respective spot colors has been divided into a first section (1000 of FIG. 10A, and 1100 of FIG. 11A) of spot colors having avg CII values less than 1.0 and, for explanatory purposes, further divided into another section (1005 of FIG. 10B, and 1105 of FIG. 11B) with avg CII values greater than 5.0. In FIG. 11A, notice that spot color Pantone® 664U (at 1110 of FIG. 11A) had an avg CII=0.55 when printed on the iGen4. Whereas, Pantone® 664U (at 1010 of FIG. 10A) has an avg CII=0.99 when printed on the Offset Printer. This same color appears in the first section of each of the color inconstancy guides for these two devices. As such, Pantone® 664U will have color constancy, i.e., will be perceived as being the same color, when printed on both the iGen4 and the Offset Printer. In a print/copy job environment, the operator may select this color for use on both devices based on this color being in the 'first section' of each device's respective color inconstancy guide. In another example, Pantone® 276U (at 1115 of FIG. 11A) has an avg CII=0.58 on the iGen4. Whereas, Pantone® 276U has an avg CII=1.299 on the Offset Printer (not shown). Hence, Pantone® 276U is well suited for printing on the iGen4 but will have a measure of color inconstancy when printed using the Offset Printer. Using the color inconstancy guides generated for each of these two device, the operator or manager of the print/copy job environment will take this information into consideration when selecting colors to use for print jobs.

Similarly, Pantone® 10U (at 1020 in FIG. 10A) has an avg CII=0.9 on the Offset Printer and an avg CII=2.76 for iGen4 (value not shown) thereby indicating to the operator that Pantone® 10U (warm gray) is not well suited for the iGen4. This information is very useful to the operator of complex document reproduction devices in a print/copy job environment before decisions are made as to specific print devices to use for the various spot color applications.

As previously discussed, various recommendations as to a print device to use, or a media type, or a halftone screen can be further provided for each color in the color inconstancy guide.

Example Networked Print/Copy Job Environment

Reference is now being made to FIG. 12 which is one example of a networked print/copy job environment wherein various features of the present color inconstancy guide for spot color printing applications will likely find their intended uses. The following is intended to provide a general description of a suitable environment in which the present method and system may be implemented. It should be understood that other environments are equally capable of effectuating various features of the present system and method.

In FIG. 12, networked document reproduction environment 1200 is shown generally having computer systems connected to various printing and copying devices over network 1201. Such a networked environment may be wholly incorporated within the confines of a single print/copy job center or facility, or may be distributed among different locations. Document reproduction environment 1200 includes computer server 1202 and desktop computer 1204 wherein various embodiments of the present method are performed. Computers 1202-1204 can be any of a desktop, laptop, server, mainframe, or the like, as are common in the arts. In one embodiment, a color inconstancy guide generated in accordance with the teachings hereof is provided by computer 1204 to server 1202 for distribution over the network. Print/copy job environment 1200 includes a plurality of image input devices and image output devices 1206-1214. Computers 102 and 104 are capable of receiving a print/copy job from scanning device 112, print/copy devices 106, 108, 110, and 114, over network 101 and sending that job to any of the output devices 106-114. Scanning device 1212, as is common in the arts, is capable of digitizing a document (not shown) which has been placed on platen 1220, and providing a digital representation of the scanned document over network 1201 to any of the other networked devices shown.

Computer system 1202 is in communication with computer system 1204 and print/copy devices 1206-1214 via network 1201. All the other devices shown in the illustrated networked configuration of FIG. 12 are also in communication with each other via network 1201. Many aspects of network 1201, illustrated as an amorphous cloud, are commonly known and may include the Internet, WIFI, or LAN. A further discussion as to the construction and/or operation of the network or the internet itself has been omitted. Suffice it to say, data is transmitted in packets between networked devices via a plurality of diverse communication links such that one device with access to the network can communicate with another device over the network using established protocols. Data is transferred in the form of signals which may be, for example, electronic, electromagnetic, optical, infrared, or other signals. These signals are provided to a device such as a server 1202, which transmits and receives data packets by means of wire, cable, fiber optic, phone line, cellular link, RF, satellite, or any other communications link known in the arts. Computers 1202-1204 and devices 1206-1214 each include a network interface card (not shown) which facilitates the transmission of data over network 1201.

Computers 1202 and 1204, and various devices of document reproduction environment 1200, include at least one processor capable of executing machine readable program instructions for performing various operations thereon including various embodiments of the present system and method as described with respect to any portions of the example flow diagram of FIG. 2 and the example block diagram of FIG. 3. Computers 1202-1204 also each have a hard disk (not shown) internal in computer cases 1224. Computers 1202 and 1204 are capable of reading and writing to storage device 1222 wherein a computer readable medium such as a floppy disk, magnetic tape, optical disk, CD-ROM (shown at 1220), DVD, etc., is inserted (or mounted) for loading/reading/storing software programs, files, data, records, and the like. Computing devices 1202-1204 further comprise a memory, communications link (as will be discussed herein further), a display device 1226 such as a CRT or LCD as a visual display of information and a keyboard 1228 for manual data entry. Computer 1204 is shown with mouse 1216. Computer system 1202-1204 include a communications interface which acts as both an input/output to allow software and data to be transferred to/from external devices placed in communication therewith. Example communications interfaces include a modem, a network interface (such as an Ethernet card), a communications port, a PCMCIA slot and card, etc.

In the embodiment shown, computer system 1202 implements database 1218 wherein various spot color libraries and various entries of the first and second sections of the sorted lists comprising the color inconstancy guide produced in accordance herewith, may be stored and all, or portions thereof, retrieved in response to a query. Although the database is shown as a external device, the database will likely be internal to computer system 1202 mounted on a hard disk contained therein. Database 1218 is capable of indexing a plurality of records, receiving and interpreting a query, and retrieving one or more of the appropriate records in response to the query. The database is also capable of adding new records and updating existing records already stored. Records stored in the database can be indexed, retrieved, modified, and updated by system 1202. Depending on the level of sophistication of the print/copy job environment 1200 and the needs of the end-users thereof, any of the networked devices may be placed in communication with system 1202 to access/update database 1218. It should be clearly understood that a record, as used herein with respect to database 1218, is intended to mean any data structure containing information which can be indexed, stored, and searched and retrieved by a database engine in response to a query. Such a record can be configured though a software construct to contain any number of fields of information. Such constructs are well known in the database arts. Since techniques for database construction, optimization, indexing, query optimization, and record retrieval are well known in the arts, a further discussion as to a specific database implementation is omitted herein. Suffice it to say that one of ordinary skill would be able to purchase a database from a vendor which is capable of storing and retrieving records in response to a query.

Devices 1206, 1208, and 1214 include a user interface (UI) 1230 through which user instructions and selections may be manually entered. User interface 1230 is any conventional user interface found in the arts and may include data entry devices such as a keyboard, numeric pad, and a mouse. In one embodiment, user interface 1230 comprises a touchscreen display. Device 1206 includes a paper tray 1232, a processing control unit (shown generally at 1234), and one or more paper trays 1236 for retaining a variety of print media/stock. One or more of devices 1206, 1208, and 1214 further incorporates various features, capabilities, and functionality of scanner 1212. Printer 1210 is a printer of simple constructions, as opposed to the complex design of the other devices in the example networked print/copy job environment 1200. Many complex document reproduction devices, as shown with respect to devices 1206, 1208, and 1214, can configure internal pathways to, for example, transport a certain type of print media having a particular size or orientation. Such complex systems have many such components capable of being configured based up on media attributes entered or otherwise selected by a user/operator. In complex print systems, such as devices 1206, 1208, and 1214, the operator may manually enter or change one or more of a device's configuration settings through user interface 1230 to ensure optimal device performance and job quality for a given selected media type desired for that print job, in part, based upon the recommendations provided with the present color inconstancy guide. A display on the print/copy device, which is of course one of many possible displays retained in a memory associated with user interface 1230, includes device-specific program instructions for instructing the processor control unit 1234 to configure the print/copy device based on the attributes entered for a media type loaded in paper tray 1236. User interface 1230 includes controls for programming a range of values for the attributes for the various types of print media, allowing the print media loaded in a paper tray to be utilized for a variety of print jobs. User interface 1230 includes controls for programming the specific system settings to configure the print/copy devices based upon media type attributes.

Any of the networked devices 1202-1216 may include an Ethernet or similar card to connect to network 1201 using, for example, a modem. Typical network interface cards found in the arts also enable one or more of the functionality of, for example, general purpose systems such as POTS (Plain Old Telephone System) and Integrated Services Digital Network (ISDN) and/or special purpose systems such as a Local Area Network (LAN) and Wireless Area Network (WAN) functionality. It is well known that document reproduction printing systems are capable of communicating and/or reporting via bi-directional protocols such as Internet Printing Protocol (IPP), Job Definition Format (JDF), or Simple Network Management Protocol (SNMP).

Example Special Purpose Computer

Figure 13:
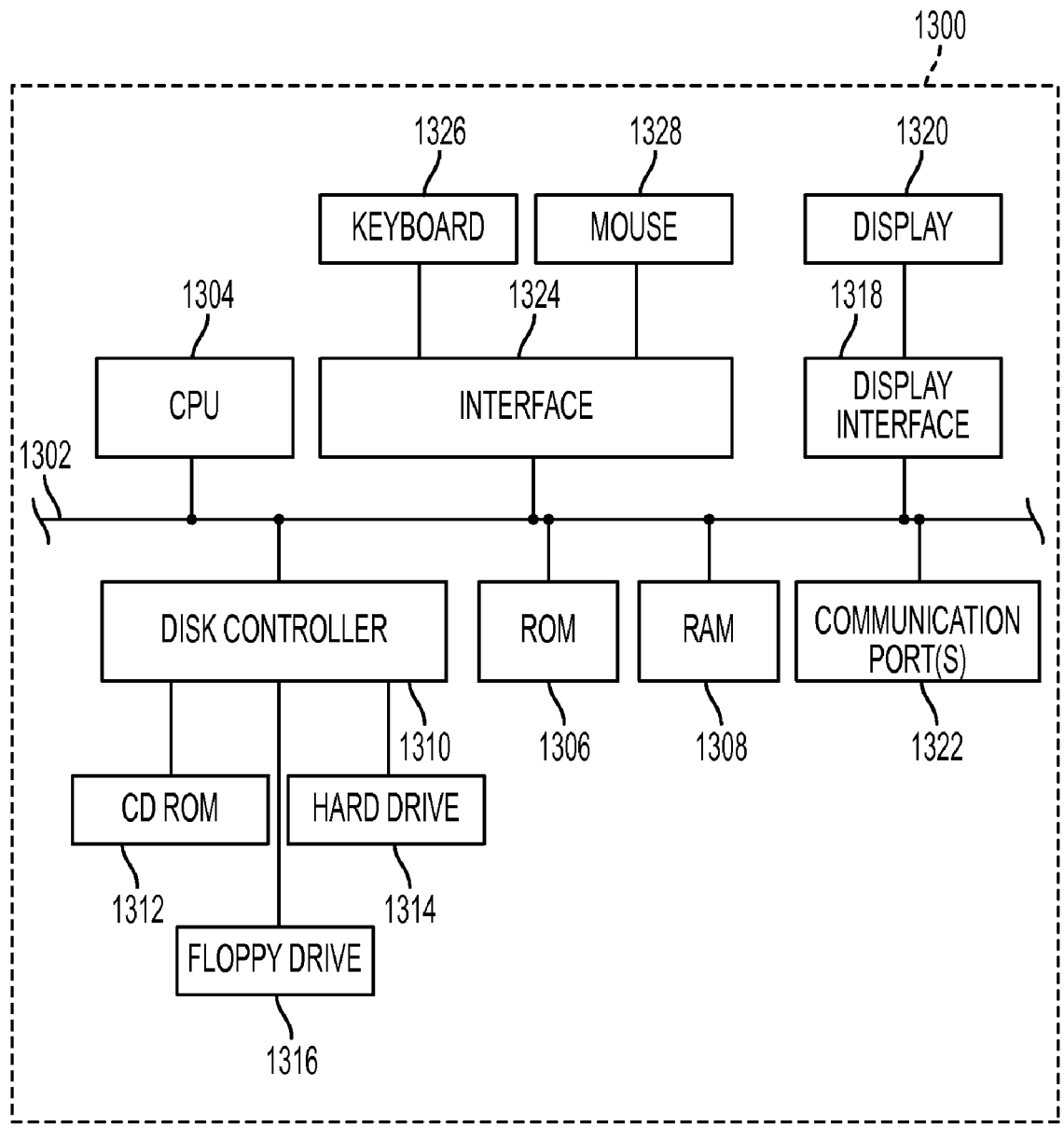
FIG. 13 illustrates a block diagram of one example embodiment of a special purpose computer system for performing one or more aspects of the present system and method as described with respect to the example flow diagram of FIG. 2 and the example functional block diagram of FIG. 3.

Reference is now being made to FIG. 13 which illustrates a block diagram of one example embodiment of a special purpose computer system for performing one or more aspects of the present system and method as described with respect to the example flow diagram of FIG. 2 and the example functional block diagram of FIG. 3. Such a special purpose processor is capable of executing machine readable program instructions for carrying out one or more aspects of the present method and may comprise any of a micro-processor or micro-controller, ASIC, electronic circuit, or special purpose computer system. Such a system can be integrated, in whole or in part, with a xerographic system, color management system, or image processing system, or any of the devices of the networked print/copy job environment of FIG. 12. All or portions of the flow diagram of FIG. 2 and the functional block diagram of FIG. 3, as illustrated and described herein, may be implemented partially or fully in hardware in conjunction with machine executable instructions in communication with various components of such a system.

The special purpose computer incorporates a central processing unit (CPU) 1304 capable of executing machine readable program instructions for performing any of the calculations, comparisons, logical operations, and other program instructions for performing the methods described above with respect to the flow diagrams and illustrated embodiments hereof. The CPU is in communication with Read Only Memory (ROM) 1306 and Random Access Memory (RAM) 1308 which, collectively, constitute example memory storage devices. Such memory may be used to store machine readable program instructions and other program data and results to sufficient to carry out any of the functionality described herein. Disk controller 1310 interfaces with one or more storage devices 1314. These storage devices may comprise external memory, zip drives, flash memory, USB drives, memory sticks, or other storage devices with removable media such as CD-ROM drive 1312 and floppy drive 1316. Machine executable program instructions execute the methods hereof or perform any of the functionality show with respect to the above-described embodiments. Computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein.

Display interface 1318 effectuates the display of information on display device 1320 in various formats such as, for instance, audio, graphic, text, and the like. Interface 1324 effectuates a communication via keyboard 1326 and mouse 1328. Such a graphical user interface is useful for a user to review any of the identified objects and/or user markings and for entering information about any of the displayed information in accordance with various embodiments hereof. Communication with external devices may occur using example communication port(s) 1322. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports 1322 are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

One or more aspects of the methods described herein are intended to be incorporated in an article of manufacture, including one or more computer program products, having computer usable or machine readable media. The article of manufacture may be included on at least one storage device readable by machine architectures or other xerographic or image processing systems embodying executable program instructions capable of performing one or more aspects of the present method, as described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for generating a color inconstancy guide for spot color print applications in a print/copy job environment, the method comprising:

selecting spot colors of interest from a library of spot colors for a reference color marking device;

obtaining at least one color value for each spot color of interest, said at least one color value being defined by at least one illumination and at least one observer angle;

calculating, using a color inconstancy metric, a color inconstancy value for each spot color of interest, said color inconstancy value being based upon each spot color's respective at least one color value;

sorting said color inconstancy values to obtain a sorted list of color inconstancy values and their respective spot colors of interest;

dividing said sorted list of color inconstancy values into at least a first and second section, said first section comprising spot colors of interest with lower color inconstancy values such that the respective spot colors will appear substantially similar when viewed under different illuminants when rendered on different image output devices, and said second section comprising spot colors with higher color inconstancy values such that the respective spot colors will have an increased likelihood of color inconstancy;

generating a color inconstancy guide using said color inconstancy values and respective spot colors of interest from at least said first section of said sorted list for spot color print applications; and communicating said color inconstancy guide to a storage device.

2. The method of claim 1, wherein said library of spot colors comprises colors defined by any of: Pantone®, Toyo, DIC, ANPA, GCMI, HKS, and user-defined colors.

3. The method of claim 1, wherein said color value is obtained from at least one spectral reflectance value obtained from any of: spectral data defined by a standard, a spectrophotometer, and a spectral printer model of said reference color marking device.

4. The method of claim 1, wherein obtaining said at least one color value for each spot color of interest comprises:
  printing at least one test patch of each respective spot color of interest using said reference color marking device; and
  measuring at least one color value from said printed test patch using any of: a spectrophotometer, a colorimeter, and a scanning device.

5. The method of claim 1, wherein said color inconstancy metric comprises any of: a simple color inconstancy index, and a rigorous color inconstancy index.

6. The method of claim 1, wherein calculating said color inconstancy value comprises:
  calculating separate color inconstancy values for each of an illuminant and observer angle using said color inconstancy metric; and
  averaging said separate color inconstancy values across both said illuminants and observer angles to obtain said color inconstancy value.

7. The method of claim 1, wherein calculating said color inconstancy value comprises calculating a color inconstancy value for each of: a printer type, a media type, and a halftone screen.

8. The method of claim 1, wherein generating said color inconstancy guide comprises any of:
  printing, using an image output device, at least said first section of said sorted list to produce a hardcopy;
  communicating at least said first section of said sorted list over a network to a remote computer system;
  storing at least said first section of said sorted list to storage device; and
  displaying at least said first section of said sorted list on a display device.

9. The method of claim 1, further comprising:
  querying said color inconstancy guide in response to a desired spot color having been chosen for use by a target color marking device;
  providing, in response to said query, said desired spot color's respective color inconstancy value;
  determining whether said desired spot color's respective color inconstancy value is in said first section of said sorted list; and
  providing, in response to said desired spot color's respective color inconstancy value not being in said first section of said sorted list, a notification that said desired spot color has been determined to have an increased likelihood of color inconstancy.

10. The method of claim 9, wherein said notification further comprises a recommendation comprising any of: another spot color to use, a printer to use, a media type to use, and a halftone screen to use.

11. The method of claim 1, further comprising:
  retrieving, in response to a user query, a range of color inconstancy values from said color inconstancy guide; and
  displaying said retrieved range of color inconstancy values on a display device.

12. A system for generating a color inconstancy guide, the system comprising:
  a memory;
  a storage medium for storing data;
  a color value measuring device; and
  a processor in communication with said memory, said storage medium, and said color value measuring device, said processor executing machine readable instructions for performing the method of:
    selecting spot colors of interest from a library of spot colors for a reference color marking device;
    obtaining at least one color value for each spot color of interest, said at least one color value being defined by at least one illumination and at least one observer angle;
    calculating, using a color inconstancy metric, a color inconstancy value for each spot color of interest, said color inconstancy value being based upon each spot color's respective at least one color value;
    sorting said color inconstancy values to obtain a sorted list of color inconstancy values and their respective spot colors of interest;
    dividing said sorted list of color inconstancy values into at least a first and second section, said first section comprising spot colors of interest with lower color inconstancy values such that the respective spot colors will appear substantially similar when viewed under different illuminants when rendered on different image output devices, and said second section comprising spot colors with higher color inconstancy values such that the respective spot colors will have an increased likelihood of color inconstancy; and
    generating a color inconstancy guide using said color inconstancy values and respective spot colors of interest from at least said first section of said sorted list for spot color print applications.

13. The system of claim 12, wherein said library of spot colors comprises colors defined by any of: Pantone®, Toyo, DIC, ANPA, GCMI, HKS, and user-defined colors.

14. The system of claim 12, wherein said color value is obtained from at least one spectral reflectance value obtained from any of: spectral data defined by a standard, a spectrophotometer, and a spectral printer model of said reference color marking device.

15. The system of claim 12, wherein obtaining said at least one color value for each spot color of interest comprises:
  printing at least one test patch of each respective spot color of interest using said reference color marking device; and
  measuring at least one color value from said printed test patch using any of: a spectrophotometer, a colorimeter, and a scanning device.

16. The system of claim 12, wherein said color inconstancy metric comprises any of: a simple color inconstancy index, and a rigorous color inconstancy index.

17. The system of claim 12, wherein calculating said color inconstancy value comprises:
  calculating separate color inconstancy values for each of an illuminant and observer angle using said color inconstancy metric; and
  averaging said separate color inconstancy values across both said illuminants and observer angles to obtain said color inconstancy value.

18. The system of claim 12, wherein calculating said color inconstancy value comprises calculating a color inconstancy value for each of: a printer type, a media type, and a halftone screen.

19. The system of claim 12, wherein generating said color inconstancy guide comprises any of:
  printing, using an image output device, at least said first section of said sorted list to produce a hardcopy;
  communicating at least said first section of said sorted list over a network to a remote computer system;
  storing at least said first section of said sorted list to storage device; and displaying at least said first section of said sorted list on a display device.

20. The system of claim 12, further comprising:
querying said color inconstancy guide in response to a desired spot color having been chosen for use by a target color marking device;
providing, in response to said query, said desired spot color's respective color inconstancy value;
determining whether said desired spot color's respective color inconstancy value is in said first section of said sorted list; and
providing, in response to said desired spot color's respective color inconstancy value not being in said first section of said sorted list, a notification that said desired spot color has been determined to have an increased likelihood of color inconstancy, said notification comprising a recommendation comprising any of: another spot color to use, a printer to use, a media type to use, and a halftone screen to use.

21. The system of claim 12, further comprising:
retrieving, in response to a user query, a range of color inconstancy values from said color inconstancy guide; and
displaying said retrieved range of color inconstancy values on a display device.

22. A computer implemented method for generating a color inconstancy guide for spot color print applications in a print/copy job environment, the method comprising:
selecting spot colors of interest from a library of spot colors for a reference color marking device, said library comprising colors defined by any of: Pantone®, Toyo, DIC, ANPA, GCMI, HKS, and user-defined colors;
obtaining at least one color value for each spot color of interest;
calculating, using a color inconstancy metric, a color inconstancy value for each spot color of interest, said color inconstancy value being based upon each spot color's respective at least one color value;
sorting said color inconstancy values to obtain a sorted list of color inconstancy values and their respective spot colors of interest;
dividing said sorted list of color inconstancy values into at least a first and second section, said first section comprising spot colors of interest with lower color inconstancy values such that the respective spot colors will appear substantially similar when viewed under different illuminants when rendered on different image output devices, and said second section comprising spot colors with higher color inconstancy values such that the respective spot colors will have an increased likelihood of color inconstancy;
generating a color inconstancy guide using said color inconstancy values and respective spot colors of interest from at least said first section of said sorted list for spot color print applications; and
communicating said color inconstancy guide to a storage device.

23. The computer implemented method of claim 22, wherein said color inconstancy metric comprises any of: a simple color inconstancy index, and a rigorous color inconstancy index.

24. The computer implemented method of claim 22 wherein calculating said color inconstancy value comprises:
calculating separate color inconstancy values for each of an illuminant and observer angle using said color inconstancy metric; and
averaging said separate color inconstancy values across both said illuminant and said observer angles to obtain said color inconstancy value.

25. The computer implemented method of claim 22, wherein generating said color inconstancy guide comprises any of:
printing, using an image output device, at least said first section of said sorted list to produce a hardcopy;
communicating at least said first section of said sorted list over a network to a remote computer system;
storing at least said first section of said sorted list to storage device; and
displaying at least said first section of said sorted list on a display device.

* * * * *